(12) United States Patent
Masuda et al.

(10) Patent No.: US 8,859,087 B2
(45) Date of Patent: Oct. 14, 2014

(54) INSULATING FILM

(75) Inventors: Shigeyoshi Masuda, Anpachi-gun (JP); Dai Nakagawa, Anpachi-gun (JP); Kinji Hasegawa, Anpachi-gun (JP)

(73) Assignee: Teijin Limited, Osaka (JP)

( * ) Notice: Subject to any disclaimer, the term of this patent is extended or adjusted under 35 U.S.C. 154(b) by 220 days.

(21) Appl. No.: 12/665,618

(22) PCT Filed: Jun. 19, 2008

(86) PCT No.: PCT/JP2008/061598
§ 371 (c)(1),
(2), (4) Date: Dec. 18, 2009

(87) PCT Pub. No.: WO2008/156210
PCT Pub. Date: Dec. 24, 2008

(65) Prior Publication Data
US 2010/0178483 A1 Jul. 15, 2010

(30) Foreign Application Priority Data

| Jun. 21, 2007 | (JP) | 2007-163566 |
| Sep. 6, 2007 | (JP) | 2007-231687 |
| Oct. 18, 2007 | (JP) | 2007-271356 |
| Mar. 28, 2008 | (JP) | 2008-086358 |

(51) Int. Cl.
*C08J 5/18* (2006.01)
*H01G 4/224* (2006.01)
*B32B 27/04* (2006.01)
*B32B 27/32* (2006.01)
*H01G 4/18* (2006.01)

(52) U.S. Cl.
CPC ... *H01G 4/18* (2013.01); *C08J 5/18* (2013.01); *H01G 4/224* (2013.01); *C08J 2325/06* (2013.01); *Y10S 428/91* (2013.01)
USPC ........... 428/220; 428/323; 428/327; 428/331; 428/500; 428/910; 428/847.4

(58) Field of Classification Search
CPC ............ B32B 27/04; B32B 27/32; C08J 5/18; H01G 4/224
USPC .................. 428/220, 323, 327, 331, 500, 910
See application file for complete search history.

(56) References Cited

U.S. PATENT DOCUMENTS

| 5,093,758 | A | 3/1992 | Funaki et al. |
| 5,166,238 | A | 11/1992 | Nakano et al. |
| 5,891,951 | A | 4/1999 | Nakano et al. |
| 2007/0090557 | A1* | 4/2007 | Oya ..................... 264/173.15 |
| 2007/0281186 | A1* | 12/2007 | Yoshida et al. ............ 428/847.4 |

FOREIGN PATENT DOCUMENTS

| JP | 1-182346 | A | | 7/1989 |
| JP | 1-316246 | A | | 12/1989 |
| JP | 03-124750 | A | | 5/1991 |
| JP | 05-200858 | | * | 8/1993 |
| JP | 5-200858 | A | | 8/1993 |
| JP | 06-057013 | A | | 3/1994 |
| JP | 06-057015 | A | | 3/1994 |
| JP | 06-057016 | A | | 3/1994 |
| JP | 06-080793 | A | | 3/1994 |
| JP | 6-114924 | A | | 4/1994 |
| JP | 6-114925 | A | | 4/1994 |
| JP | 7-24911 | A | | 1/1995 |
| JP | 7-117187 | A | | 5/1995 |
| JP | 7-149922 | A | | 6/1995 |
| JP | 07-156263 | A | | 6/1995 |
| JP | 9-262851 | A | | 10/1995 |
| JP | 08-283496 | A | | 10/1996 |
| JP | 09-039066 | A | | 2/1997 |
| JP | 01240548 | | * | 9/2001 |
| JP | 2007-009112 | A | | 1/2007 |
| JP | 2009-062456 | | * | 3/2009 |
| JP | 2007-115447 | A | | 5/2010 |
| WO | 2008/040670 | A1 | | 4/2008 |

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

The present invention is to provide an insulating film having a high breakdown voltage and excellent heat resistance and handling properties. The present invention is a biaxially oriented insulating film which contains (i) a styrene-based polymer having a syndiotactic structure and (ii) particles and which has a refractive index in the thickness direction of 1.6050 to 1.6550.

9 Claims, No Drawings

INSULATING FILM

TECHNICAL FIELD

The present invention relates to an insulating film. More specifically, it relates to an insulating film having excellent electric properties and heat resistance and an especially high breakdown voltage.

BACKGROUND OF THE ART

A stretched film made of syndiotactic polystyrene is expected to be used for various purposes due to its excellent heat resistance, chemical resistance, hot water resistance, dielectric property and electric insulation. Particularly, the stretched film is used as an insulator for capacitors since it has excellent dielectric property and high electric insulation and heat resistance. For example, patent documents 1 to 4 propose a film for capacitors comprising syndiotactic polystyrene.

| (Patent Document 1) | JP-A 3-124750 |
| (Patent Document 2) | JP-A 6-80793 |
| (Patent Document 3) | JP-A 7-156263 |
| (Patent Document 4) | JP-A 8-283496 |

DISCLOSURE OF THE INVENTION

However, in a high-performance capacitor to be mounted on hybrid cars of recent years, a film having a high breakdown voltage and excellent heat resistance is required. To improve the capacitance of a capacitor and reduce the size of a capacitor, the thickness of an insulating film must be further reduced. However, when the film is made thin, film breakage readily occurs at the time of stretching and the windability of the film degrades, thereby reducing the handling properties of the film and the productivity of the film itself. When the handling properties of the film deteriorate, the production efficiency of the capacitor also lowers.

It is therefore an object of the present invention to provide an insulating film having a high breakdown voltage and excellent heat resistance and handling properties.

The inventors of the present invention have conducted intensive studies to solve the above problem and have found that a biaxially oriented film which contains syndiotactic polystyrene and particles and has a specific orientation structure has a high breakdown voltage and excellent heat resistance and handling properties. The present invention has been accomplished based on this finding.

That is, the present invention is a biaxially oriented insulating film which contains (i) a styrene-based polymer having a syndiotactic structure and (ii) particles and which has a refractive index in the thickness direction of 1.6050 to 1.6550.

The present invention includes a biaxially oriented insulating film (may be referred to as "film (1)" hereinafter) which contains (i) a styrene-based polymer having a syndiotactic structure and (ii) 0.01 to 1.5 mass % of spherical crosslinked polymer particles A1 having an average particle diameter of 0.5 to 3.0 μm and a particle diameter ratio of 1.0 to 1.3 and which has a refractive index in the thickness direction of 1.6050 to 1.6550.

The present invention also includes a biaxially oriented insulating film (may be referred to as "film (2)" hereinafter) which contains (i) a styrene-based polymer having a syndiotactic structure, (ii-1) 0.01 to 1.5 mass % of silica particles A2 having an average particle diameter of 0.6 to 3.0 μm and a relative standard deviation of particle diameter of 0.5 or less, and (ii-2) 0.05 to 2.0 mass % of inert fine particles B2 having an average particle diameter of 0.01 to 0.5 μm and a relative standard deviation of particle diameter of 0.5 or less and which has a refractive index in the thickness direction of 1.6050 to 1.6550.

The present invention further includes a biaxially oriented insulating film (may be referred to as "film (3)" hereinafter) which contains (i) a styrene-based polymer having a syndiotactic structure, (ii) 0.01 to 5.0 mass % of fine particles having an average particle diameter of 0.01 to 3.0 μm, and (iii) 3 to 48 mass % of a resin X having a dielectric constant 0.2 or more different from that of the styrene-based polymer and which has a refractive index in the thickness direction of 1.6050 to 1.6550.

The present invention still further includes a biaxially oriented insulating film (may be referred to as "film (4)" hereinafter) which contains (i) a styrene-based polymer having a syndiotactic structure, (ii) 0.01 to 1.5 mass % of inert fine particles A4 having an average particle diameter of 0.2 to 3.0 μm and a relative standard deviation of particle diameter of 0.5 or less, and (iii) 0.1 to 8 mass % of an antioxidant and which has a refractive index in the thickness direction of 1.6050 to 1.6550.

BEST MODE FOR CARRYING OUT THE INVENTION

[Common Terms]

There are four films (1) to (4) in the present invention as described above. A description is first given of terms common to these films.

(Styrene-Based Polymer)

The styrene-based polymer in the present invention is a styrene-based polymer having a syndiotactic structure. That is, it has a steric structure in which phenyl groups or substituted phenyl groups as side chains are alternately positioned in opposite directions in the main chain formed from carbon-carbon bonds. In general, tacticity is determined through the nuclear magnetic resonance method ($^{13}$C-NMR) making use of an isotope carbon and can be represented by the number of existing plural continuous constituent unit. For example, in the case in which two continuous units exists, the tacticity is called a diad; in the case in which three continuous units exist, it is called a triad; and in the case in which five continuous units exist, it is called a pentad. The styrene-based polymer having a syndiotactic structure has a syndiotacticity of not less than 75%, preferably not less than 85% in terms of racemidiad (r) or not less than 30%, preferably not less than 50% in terms of racemipentad (rrrr). The styrene-based polymer refers to polystyrene, poly(alkylstyrene), poly(halogenated styrene), poly(alkoxystyrene), poly(halogenated alkylstyrene), poly(vinyl benzoic acid ester), poly(vinyl naphthalene), poly(acenaphthylene), polymer obtained by hydrogenating part of an aromatic ring thereof, mixture thereof or copolymer containing these structural units.

Examples of the poly(alkylstyrene) include poly(methylstyrene), poly(ethylstyrene), poly(propylstyrene), poly(butylstyrene) and poly(phenylstyrene). Examples of the poly(halogenated styrene) include poly(chlorostyrene), poly(bromostyrene) and poly(fluorostyrene). Examples of the poly(alkoxystyrene) include poly(methoxystyrene) and poly(ethoxystyrene). Out of these, particularly preferred styrene-based polymers are polystyrene, poly(p-methylstyrene), poly(m-methylstyrene), poly(p-tertiary-butylstyrene), poly(p- chlorostyrene), poly(m-chlorostyrene), poly(p-fluorostyrene) and a copolymer of styrene and p-methylstyrene.

Further, the styrene-based polymer in the present invention may be used as a copolymer containing a comonomer component. In this case, preferred examples of the comonomer include monomers for the above styrene-based polymer, olefin monomers such as ethylene, propylene, butene, hexane and octane, diene monomers such as butadiene and isoprene, cyclic diene monomers, and polar vinyl monomers of methyl methacrylate, maleic anhydride and acrylonitrile.

The weight average molecular weight of the styrene-based polymer is preferably $1.0 \times 10^4$ to $3.0 \times 10^6$, more preferably $5.0 \times 10^4$ to $1.5 \times 10^6$, much more preferably $1.1 \times 10^5$ to $8.0 \times 10^5$. When the weight average molecular weight is $1.0 \times 10^4$ or higher, a film having a superior elongation property and further improved heat resistance can be obtained. When the weight average molecular weight is $3.0 \times 10^6$ or lower, stretching tension falls within a preferred range, whereby film breakage hardly occurs at the time of film formation.

The method of producing the styrene-based polymer having a syndiotactic structure is disclosed, for example, by JP-A 62-187708. That is, it can be produced by polymerizing a styrene-based monomer (a monomer corresponding to the above styrene-based polymer) in the presence of a titanium compound and a condensation product of water and an organic aluminum compound, especially trialkyl aluminum, as catalysts in an inert hydrocarbon solvent or in the absence of a solvent. The poly(halogenated alkylstyrene) is disclosed by JP-A 1-146912, and the hydrogenated polymer is disclosed by JP-A 1-178505.

A suitable amount of an additive such as a known antistatic agent may be optionally added to the styrene-based polymer having a syndiotactic structure in the present invention. The amount of the additive is preferably not more than 10 parts by mass based on 100 parts by mass of the styrene-based polymer. When the amount is larger than 10 parts by mass, film breakage readily occurs at the time of stretching, whereby production stability becomes unsatisfactory disadvantageously. The styrene-based polymer having a syndiotactic structure is much superior to a conventional styrene-based polymer having an atactic structure in heat resistance.

(Particles)

The film of the present invention contains particles. The average particle diameter of the particles is preferably 0.01 to 3.0 μm. When the average particle diameter of the particles falls within this range, handling properties such as windability and workability can be made excellent while excellent electric properties are maintained. When the average particle diameter of the particles is too small, handling properties tend to deteriorate. When the average particle diameter is too large, voids in the film become large in size, whereby the electric properties tend to deteriorate.

The film of the present invention contains 0.01 to 5.0 mass % of the particles based on 100 mass % of the film. When the content of the particles falls within this range, the windability and workability of the film can be made excellent while the high breakdown voltage of the film is maintained.

The particles may be either organic particles or inorganic particles. The organic particles are preferably polymer resin particles such as crosslinked polystyrene resin particles, crosslinked silicone resin particles, crosslinked acrylic resin particles, crosslinked styrene-acrylic resin particles, crosslinked divinyl benzene-acrylic resin particles, crosslinked polyester resin particles, polyimide resin particles or melamine resin particles. Out of these, silicone resin particles and crosslinked polystyrene resin particles are particularly preferred because they are excellent in slipperiness and chipping resistance.

Examples of the inorganic particles include (1) silicon dioxide (including hydrate, quartz sand and quartz); (2) alumina in various crystal forms; (3) silicates containing not less than 30 mass % of a $SiO_2$ component (for example, amorphous or crystalline clay minerals, alumino silicate (including baked product and hydrate), chrysotile asbestos, zircon and fly ash); (4) oxides of Mg, Zn, Zr and Ti; (5) sulfates of Ca and Ba; (6) phosphates of Li, Ba and Ca (including monohydrogen salts and dihydrogen salts); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (for example, carbon black and graphite); (12) glass (for example, glass powders and glass beads); (13) carbonates of Ca and Mg; (14) fluorite; and (15) spinel type oxides. Out of these, calcium carbonate particles and silica particles are preferred, and silica particles are particularly preferred because they are excellent in slipperiness and chipping resistance.

In the present invention, one type of particles may be contained but it is preferred that two or more different types of particles should be contained because the effect of improving handling properties can be made large without reducing the breakdown voltage. In this case, two or more different types of particles which differ in composition may be contained, two or more different types of particles which differ in average particle diameter may be contained, two or more different types of particles which differ in shape may be contained, or a combination of these particles may be contained. It is particularly preferred that two or more different types of particles which differ in at least average particle diameter should be contained.

(Refractive Index in Thickness Direction)

The film of the present invention has a refractive index in the thickness direction of 1.6050 to 1.6550. When the refractive index in the thickness direction is set to the above range, the breakdown voltage can be made high. Further, the frequency of film breakage in the film production process drops, thereby making it possible to improve productivity. When the refractive index in the thickness direction is too high, the frequency of film breakage in the film production process tends to increase, thereby reducing the productivity of the film. When the refractive index is too low, the breakdown voltage tends to become low with the result of the deterioration of electric properties. The frequency of film breakage in the capacitor production process increases, thereby reducing the productivity of a capacitor. Further, the thickness nonuniformity of the film tends to becomes large, thereby making it difficult to obtain a capacity having stable quality.

To set the refractive index in the thickness direction to the above range, a production method which will be described hereinafter should be employed. That is, the preferred refractive index in the thickness direction in the present invention is achieved by setting the draw ratio of the film to a specific range and dividing the stretching temperature for stretching the film in a direction perpendicular to the monoaxial direction which is carried out after the film is stretched in the monoaxial direction into a plurality of stages and making a specific temperature difference between the temperature of the first stage and the temperature of the last stage.

(Other Additives)

The film of the present invention may contain other resin components in order to improve its moldability, mechanical properties and surface properties.

The other resin components which may be contained include a styrene-based polymer having an atactic structure, a styrene-based polymer having an isotactic structure, a polyphenylene ether and a styrene-maleic anhydride copolymer. They are compatible with the styrene-based polymer having a syndiotactic structure and effective for the control of crystallization for producing a preform to be stretched. Therefore, they are preferred because stretchability is improved after that, the control of stretching conditions is easy, and a film having excellent mechanical properties can be obtained. When a styrene-based polymer having an atactic structure and/or isotactic structure out of these is to be contained, it is preferably obtained from the same monomer as that of the styrene-based polymer having a syndiotactic structure. The total content of these compatible resin components is preferably not more than 40 parts by mass, more preferably not more than 20 parts by mass, particularly preferably not more than 10 parts by mass based on 100 parts by mass of the styrene-based polymer having a syndiotactic structure. When the total content of the compatible resin components is larger than 40 parts by mass, the effect of improving heat resistance which is the merit of the styrene-based polymer having a syndiotactic structure is reduced.

Out of the other resin components, resins which are incompatible with the styrene-based polymer having a syndiotactic structure include polyolefins such as polyethylene, polypropylene, polybutene and polypentene. Polyesters such as polyethylene terephthalate, polybutylene terephthalate and polyethylene naphthalate are also included in the above resins. Polyamides such as nylon 6 and nylon 6,6 are also included. Resins except for the above compatible resins, such as polythioethers including polyphenylene sulfide, polycarbonate, polyacrylate, polysulfone, polyether ether ketone, polyether sulfone, polyimide, halogenated vinyl-based polymers including Teflon (registered trademark), acrylic polymers including methyl polymethacrylate, and polyvinyl alcohols are further included. Crosslinked resins including the above compatible resins are still further included. Since these resins are incompatible with the styrene-based polymer having a syndiotactic structure, when they are contained in a small amount, they can be dispersed into the styrene-based polymer having a syndiotactic structure in an island form, which is effective in providing a good luster after stretching or improving surface slipperiness. The content of the incompatible resin component is preferably not more than 30 parts by mass, more preferably not more than 20 parts by mass, particularly preferably not more than 10 parts by mass based on 100 parts by mass of the styrene-based polymer having a syndiotactic structure. When the temperature at which the film of the present invention is used as a product is high, it preferably contains an incompatible resin component which has relatively high heat resistance.

Further, additives such as antistatic agent, colorant and weatherproofing agent may be added to the film of the present invention as long as they do not impair the physical properties of the film.

Films (1) to (4) which are preferred embodiments of the present invention have the following characteristic properties in addition to the above common terms.

Embodiment 1

The film (1) according to Embodiment 1 of the present invention contains (i) a styrene-based polymer having a syndiotactic structure and (ii) 0.01 to 1.5 mass % of spherical crosslinked polymer particles A1 having an average particle diameter of 0.5 to 3.0 µm and a particle diameter ratio of 1.0 to 1.3 and has a refractive index in the thickness direction of 1.6050 to 1.6550.

The film (1) preferably further contains (ii) 0.05 to 2.0 mass % of inert fine particles B1 having an average particle diameter of 0.01 to 2.6 µm which is 0.4 µm or more smaller than the average particle diameter of the spherical crosslinked polymer particles A1. The spherical crosslinked polymer particles A1 are preferably surface treated with a silane coupling agent. The spherical crosslinked polymer particles A1 are preferably silicone resin particles. The inert fine particles B1 are preferably spherical silica particles having a particle diameter ratio of 1.0 to 1.3. The thickness of the film is preferably not less than 0.4 µm and less than 6.5 µm. The present invention includes a capacitor comprising the film (1).

(Styrene-Based Polymer)

The styrene-based polymer in the film (1) is as described in the section of "common terms".

(Spherical Crosslinked Polymer Particles A1)

The film (1) of the present invention contains 0.01 to 1.5 mass % of spherical crosslinked polymer particles A1 having an average particle diameter of 0.5 to 3.0 µm and a particle diameter ratio of 1.0 to 1.3.

The average particle diameter of the spherical crosslinked polymer particles A1 is 0.5 to 3.0 µm, preferably 0.6 to 2.0 µm, more preferably 0.8 to 1.6 µm. When the average particle diameter is smaller than 0.5 µm, slipperiness and windability deteriorate. When the average particle diameter is larger than 3.0 µm, the breakdown voltage becomes low. Particularly for application in capacitors, the growth of the space factor and an increase in the number of insulation defects occur disadvantageously.

The spherical crosslinked polymer particles A1 preferably have a sharp particle size distribution, specifically a relative standard deviation indicative of the sharpness of the distribution of 0.5 or less. When the relative standard deviation becomes small, that is, the particle size distribution becomes sharp, large projections on the surface of the film become uniform in height. Thereby, windability becomes high, the numbers of coarse particles and large projections become small, the number of defects decreases, and the breakdown voltage can be further improved. From this point of view, the relative standard deviation indicative of the particle size distribution of the spherical crosslinked polymer particles A1 is more preferably 0.4 or less, much more preferably 0.3 or less, particularly preferably 0.2 or less.

The shape of the spherical crosslinked polymer particles A1 is substantially globular or spherical. When they are globular or spherical, they can provide slipperiness effectively. Stated more specifically, the particle diameter ratio indicative of the sphericity of each particle must be 1.0 to 1.3. The particle diameter ratio is preferably 1.0 to 1.2, more preferably 1.0 to 1.1. When the particle diameter ratio increases, the particles becomes less globular. Therefore, voids are readily formed around the particles, an insulation defect is easily produced, and the breakdown voltage lowers disadvantageously.

The apparent Young's modulus of the spherical crosslinked polymer particles A1 is preferably 10 to 100 kg/mm$^2$, more preferably 10 to 50 kg/mm$^2$. When the apparent Young's modulus is not less than 10 kg/mm$^2$, the particles hardly deform and maintain their shapes at the time of stretching the film, thereby making it possible to further improve slipperiness and windability. When the apparent Young's modulus is not more than 100 kg/mm$^2$, the particles hardly fall off from the film and the breakdown voltage can be further improved.

The content of the spherical crosslinked polymer particles A1 in the film (1) is 0.01 to 1.5 mass %, preferably 0.11 to 1.5 mass %, more preferably 0.26 to 0.9 mass %. When the content is lower than 0.01 mass %, windability degrades. When the content is higher than 1.5 mass %, the surface of the film becomes rough, chipping resistance degrades, and the breakdown voltage lowers. Particularly when the film is used in a capacitor, the growth of the space factor and a reduction in breakdown voltage occur disadvantageously.

Example of the spherical crosslinked polymer particles A1 include crosslinked polyacrylic resin particles, crosslinked polystyrene resin particles, crosslinked acryl-styrene copolymer resin particles and silicone resin particles.

(Silicone Resin Particles)

Out of these, silicone resin particles are the most preferred. The silicone resin particles are particles of a silicone resin containing not less than 80 mass % of a unit represented by the following formula (1).

  (1)

wherein R is at least one selected from an alkyl group having 1 to 6 carbon atoms and a phenyl group.

The above unit means the following structural formula (2)

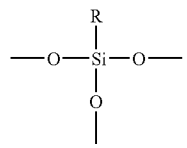  (2)

wherein R is at least one selected from an alkyl group having 1 to 6 carbon atoms and a phenyl group as described above.

R in the above formula (1) and the structural formula (2) is at least one selected from an alkyl group having 1 to 6 carbon atoms and a phenyl group. Examples of the alkyl group include methyl group, ethyl group, propyl group, butyl group, pentyl group and hexyl group. They may be used in combination of two or more. When R is a combination of two or more, for example, R is a combination of a methyl group and an ethyl group, the silicone resin particles can be produced from a mixture of methyl trimethoxysilane and ethyl trimethoxysilane as a starting material. When the production cost and ease of synthesis are taken into consideration, silicone resin (polymethylsilsesquioxane) particles in which R is a methyl group are particularly preferred.

The silicone resin particles may be produced in accordance with conventionally known methods, for example, a method in which organotrialkoxysilane is hydrolyzed and condensed (for example, JP-B 40-14917 or JP-B 2-22767) and a method of producing polymethylsilsesquioxane particles from methyl trichlorosilane as a starting material (for example, Belgian Patent No. 572412).

The silicone resin particles are preferably polymerized in the presence of a surfactant. A highly insulating film having a small number of large projections can be obtained by using silicone resin particles obtained by this method. Examples of the surfactant include polyoxyethylene alkyl ethers, polyoxyethylene alkyl phenyl ethers, polyoxyethylene sorbitan alkyl esters and alkylbenzene sulfonic acid salts. Out of these, polyoxyethylene alkyl ethers, polyoxyethylene alkyl phenyl ethers and alkylbenzene sulfonic acid salts are preferred. The polyoxyethylene alkyl ethers include polyoxyethylene lauryl ether. The polyoxyethylene alkyl phenyl ethers include an adduct of nonylphenol with ethylene oxide. The alkylbenzene sulfonic acid salts include sodium dodecylbenzene sulfonate.

(Surface Treatment)

The breakdown voltage is further improved when the spherical crosslinked polymer particles A1 are surface treated with a silane coupling agent. Examples of the silane coupling agent used for the surface treatment include vinyl triethoxysilane, vinyl trichlorosilane and vinyl tris(β-methoxyethoxy)silane having an unsaturated bond. Amino-based silanes such as N-(β-aminoethyl)-γ-aminopropylmethyl dimethoxysilane, N-(β-aminoethyl)-γ-aminopropyl trimethoxysilane, γ-aminopropyl trimethoxysilane, γ-aminopropyl triethoxysilane and N-phenyl-γ-aminopropyl trimethoxysilane are also included. Epoxy-based silanes such as β-(3,4-epoxycyclohexyl)ethyl trimethoxysilane, γ-glycidoxypropyl trimethoxysilane, γ-glycidoxypropyl methyldiethoxysilane and γ-glycidoxypropyl triethoxysilane are further included. Methacrylate-based silanes such as γ-methacryloxypropylmethyl dimethoxysilane, γ-methacryloxypropyl trimethoxysilane, γ-methacryloxypropylmethyl diethoxysilane and γ-methacryloxypropyl triethoxysilane are still further included. γ-mercaptopropyl trimethoxysilane and γ-chloropropyl trimethoxysilane are still further included. Out of these, epoxy-based silane coupling agents are preferred because they are easy to handle and coloring hardly occurs when they are added.

The surface treatment with a silane coupling agent is preferably carried out by the following method. Slurry (water slurry or organic solvent slurry) of the spherical crosslinked polymer particles A1 right after synthesis is first filtered or processed by using a centrifugal separator to separate the spherical crosslinked polymer particles A1. Thereafter, the separated spherical crosslinked polymer particles A1 are slurried again by using water or an organic solvent containing a silane coupling agent dispersed therein before or after drying and then heated. Thereafter, the particles are separated again and dried, and further heated according to the type of the silane coupling agent.

In the present invention, although the mechanism of further improving the breakdown voltage by using the spherical crosslinked polymer particles A1 surface treated with a silane coupling agent, especially silicone resin particles surface treated with a silane coupling agent is unknown, it is assumed as one of the causes of the mechanism that the silane coupling agent is adsorbed to the particles to improve affinity between the syndiotactic polystyrene and the particles with the result that the formation of voids is suppressed at the time of stretching, thereby improving the breakdown voltage.

(Inert Fine Particles B1)

The film (1) of the present invention preferably further contains inert fine particles B1 in addition to the spherical crosslinked polymer particles A1. When the film (1) contains the inert fine particles B1, the breakdown voltage can be made higher while slipperiness is maintained.

The average particle diameter of the inert fine particles B1 is preferably smaller than the average particle diameter of the spherical crosslinked polymer particles A1. The difference between the average particle diameter of the inert fine particles B1 and the average particle diameter of the spherical crosslinked polymer particles A1 is preferably not less than 0.4 μm, more preferably not less than 0.5 μm, much more preferably not less than 0.7 μm. When the difference of average particle diameter is not less than 0.4 μm, slipperiness and windability can be improved more efficiently. Further, chipping resistance can be made high.

The average particle diameter of the inert fine particles B1 is preferably 0.01 to 2.6 μm, more preferably 0.1 to 0.8 μm, much more preferably 0.2 to 0.6 μm. When the average particle diameter is smaller than 0.01 μm, the effect of improving slipperiness and windability becomes small. When the average particle diameter is set to not more than 2.6 μm, chipping resistance can be made high.

The inert fine particles B1 preferably have a sharp particle size distribution from the same point of view as the above-described spherical crosslinked polymer particles A1. The relative standard deviation indicative of the sharpness of the distribution is preferably 0.5 or less, more preferably 0.4 or less, much more preferably 0.3 or less, particularly preferably 0.2 or less.

Further, the inert fine particles B1 are preferably substantially globular or spherical. Stated more specifically, the particle diameter ratio indicative of the sphericity of each particle is preferably 1.0 to 1.3, more preferably 1.0 to 1.2, much more preferably 1.0 to 1.1. When the inert fine particles B1 are made more globular, an insulation defect can be suppressed, and the breakdown voltage can be made higher.

The content of the inert fine particles B1 is preferably 0.05 to 2.0 mass %. When the content is low, slipperiness degrades. Therefore, when the content is lower than 0.05 mass %, the effect of improving slipperiness becomes small. When the content is set to not more than 2.0 mass %, the breakdown voltage can be made higher. From this point of view, the content of the inert fine particles B1 is more preferably 0.1 to 0.6 mass %, much more preferably 0.2 to 0.4 mass %.

Although the type of the inert fine particles B1 may be the same as the type of the spherical crosslinked polymer particles A1, they are preferably different in type from the spherical crosslinked polymer particles A1 because they can provide a different function from that of the spherical crosslinked polymer particles A1. Examples of the inert fine particles B1 include (1) silicon dioxide (including hydrate, quartz sand and quartz); (2) alumina in various crystal forms; (3) silicates containing not less than 30 mass % of a $SiO_2$ component (for example, amorphous or crystalline clay minerals, alumino silicate (including baked product and hydrate), chrysotile asbestos, zircon and fly ash); (4) oxides of Mg, Zn, Zr and Ti; (5) sulfates of Ca and Ba; (6) phosphates of Li, Ba and Ca (including monohydrogen salts and dihydrogen salts); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (for example, carbon black and graphite); (12) glass (for example, glass powders and glass beads); (13) carbonates of Ca and Mg; (14) fluorite; and (15) spinel type oxides. Out of these, calcium carbonate particles and spherical silica particles are preferred and spherical silica particles are particularly preferred because excellent slipperiness and chipping resistance are obtained.

The method of containing the particles is not particularly limited if they are contained in the film (1) in the end. Examples of the method include one in which the particles are added or deposited in any step during the polymerization of the styrene-based monomer and one in which the particles are added in any step for melt extrusion. To disperse these particles effectively, a dispersant or a surfactant may be used.

(Other Additives)

Other additives which can be contained in the film (1) are as described in the section of "common terms".

(Refractive Index in Thickness Direction)

The film (1) of the present invention has a refractive index in the thickness direction of 1.6050 to 1.6550. The refractive index in the thickness direction is preferably 1.6100 to 1.6450, more preferably 1.6150 to 1.6350, particularly preferably 1.6200 to 1.6250. When the refractive index in the thickness direction is smaller than 1.6050, the breakdown voltage lowers. Also, the film is readily broken in the production process of a capacitor. Further, a capacitor having stable quality cannot be obtained because the thickness nonuniformity of the film becomes large. When a film having a refractive index in the thickness direction of more than 1.6550 is to be produced, film breakage occurs frequently in the film production process and it is extremely difficult to obtain a film.

To set the refractive index in the thickness direction to the above range, a special production method which will be described hereinafter must be employed. That is, the refractive index in the thickness direction in the present invention is achieved by dividing the stretching temperature for stretching in a direction perpendicular to the monoaxial direction which is carried out after stretching in the monoaxial direction into a plurality of stages and making a temperature difference between the temperature of the first stage and the temperature of the last stage which will be described hereinafter.

(Film Thickness)

The thickness of the film (1) is preferably not less than 0.4 μm and less than 6.5 μm, more preferably not less than 0.5 μm and less than 5.5 μm, much more preferably not less than 0.6 μm and less than 4.5 μm, particularly preferably not less than 1.0 μm and less than 3.5 μm. When the thickness of the film is smaller than 0.4 μm, film breakage readily occurs and handling properties tend to deteriorate. When the thickness is larger than 6.5 μm, the capacitance tends to lower due to a prolonged distance between the electrodes of a capacitor.

When the film is used as an insulator for capacitors, as the thickness of the film becomes smaller, the capacitance of a capacitor becomes higher advantageously. However, when the thickness of the film is reduced, the film is readily wrinkled or broken, thereby reducing its handling properties. Further, when the thickness of the film is reduced, the added particles readily fall off. When the film becomes thin, such a problem occurs that the absolute value of the breakdown voltage becomes small. Therefore, balancing them becomes essential. In the present invention, a novel highly insulating film containing specific particles and having a specific orientation structure is obtained by a special production method which will be described hereinafter without causing the above problems even when the film is made thin.

(Center Line Average Surface Roughness: Ra)

The center line average surface roughness (Ra) of the film (1) is preferably 11 to 89 nm. When the center line average surface roughness (Ra) is not less than 11 nm, slipperiness becomes high, thereby improving work efficiency. Further, when the film is wound up in a roll form, blocking is suppressed and a roll having a good wound form is easily obtained. When the center line average roughness (Ra) is not more than 89 nm, telescoping hardly occurs. From this point of view, the lower limit of the center line average surface roughness (Ra) is preferably 21 nm, more preferably 31 nm. The upper limit of the center line average surface roughness (Ra) is preferably 79 nm, more preferably 69 nm, particularly preferably 59 nm.

(10-Point Average Roughness: Rz)

The 10-point average roughness (Rz) of the film (1) is preferably 900 to 3,000 nm. When the 10-point average roughness (Rz) is not less than 900 nm and the film is wound up in a roll form, the horizontal slippage of the film is suppressed, thereby improving its windability. When the 10-point average roughness (Rz) is set to not more than 3,000 nm, the breakdown voltage can be made higher. From this point of view, the lower limit of the 10-point average roughness (Rz) is preferably 950 nm, more preferably 1,050 nm, particularly preferably 1,250 nm, and the upper limit of the 10-point average roughness (Rz) is preferably 2,600 nm, more preferably 2,250 nm, particularly preferably 1,950 nm. When the film is thin, as it is not stiff as compared with a thick film, its windability tends to become lower. Therefore, it is effective to set the 10-point average roughness (Rz) to the above range.

(Method of Producing Film (1))

The film (1) can be basically manufactured by a conventionally known method or a method which has been accumulated in the industry except for some special production conditions. A detailed description is subsequently given of the method of producing the film (1).

First, a resin composition comprising a styrene-based polymer having a syndiotactic structure as the main component is molten by heating to form an unstretched sheet. Stated more specifically, the resin composition is molten by heating at a temperature of its melting point (Tm, unit: ° C.) to (Tm+70° C.), extruded into a sheet form and solidified by cooling to obtain an unstretched sheet.

Thereafter, this unstretched sheet is stretched in biaxial directions. Stretching may be carried out in both the longitudinal direction (mechanical axis direction) and the transverse direction (direction perpendicular to the mechanical axis direction) at the same time or sequentially in any order. For example, in the case of sequential stretching, the film is first stretched to preferably 2.3 to 6.0 times, more preferably 2.5 to 5.0 times, much more preferably 2.8 to 4.6 times at a temperature of (glass transition point temperature (Tg, unit: ° C.)–10° C.) to (Tg+70° C.) in a monoaxial direction. The film is then stretched to preferably 2.5 to 7.0 times, more preferably 2.7 to 5.0 times, much more preferably 2.9 to 4.7 times at a temperature of Tg to (Tg+80° C.) in a direction perpendicular to the monoaxial direction.

Stretching in the direction perpendicular to the above monoaxial direction becomes difficult probably due to crystallization which proceeds by stretching in the previous stage, whereby film breakage readily occurs during film formation. Particularly when a thin film is to be produced and the draw ratio exceeds 3.2 times, breakage readily occurs. When a countermeasure against it was studied, it was found that it is effective to divide the stretching temperature into a plurality of stages without fixing it and make a temperature difference between the temperature of the first stage and the temperature of the last stage. As for the temperature difference, the temperature of the last stage is preferably 4° C. or more, more preferably 7° C. or more, much more preferably 11° C. or more, particularly preferably 21° C. or more higher than the temperature of the first stage. When the temperature difference is too large, stretchability degrades and the thickness nonuniformity of the film after stretching becomes large disadvantageously. The upper limit of the temperature difference is preferably 49° C., more preferably 39° C., particularly preferably 29° C. When the temperature difference between the first stage and the last stage is set to the above range, a high draw ratio which has been difficult to be achieved in the formation of a thin film can be achieved. Thereby, a film having little nonuniformity in thickness can be obtained, and the refractive index in the thickness direction of the present invention can be achieved. Further, even when the film is made thin, breakage hardly occurs, thereby making it possible to achieve the preferred film thickness in the present invention.

To make a temperature difference between the first stage and the last stage in the step of carrying out stretching in the direction perpendicular to the monoaxial direction, a temperature difference may be made between the inlet (first stage) and outlet (last stage) of one stretching zone or between the first stretching zone (first stage) and the last stretching zone (last stage) by providing two or more continuous stretching zones having different temperatures. The "zone" refers to one area partitioned by a shutter or the like in a tenter or the like. In either case, it is preferred that the section between the first stage and the last stage should be further divided so that the temperature is increased from the first stage toward the last stage obliquely, particularly linearly. For example, when there are two or more continuous stretching zones having different temperatures, preferably one or more, more preferably 1 to 10 stretching zones are provided between the first stretching zone and the last stretching zone. It is disadvantageous from the viewpoint of equipment cost that the total number of stretching zones is 13 or more. When the film is to be stretched in the transverse direction, the value obtained by dividing the width of the film right after it comes out from the last stage by the width of the film right before it enters the first stage should become the target draw ratio, and the width of the film is preferably increased obliquely, particularly linearly. Even when the film is to be stretched in the longitudinal direction and the transverse direction at the same time, the stretching temperature is divided into a plurality of stages and a temperature difference is made between the temperature of the first stage and the temperature of the last stage likewise.

Thereafter, the film (1) is heat set at a temperature of (Tg+70° C.) to Tm. The heat setting temperature is preferably 200 to 260° C., more preferably 220 to 250° C., much more preferably 230 to 240° C. When the heat setting temperature is too high and a thin film is to be produced, breakage readily occurs, and thickness nonuniformity becomes large. It is preferred to carry out relaxation at a temperature 20 to 90° C. lower than the heat setting temperature as required after heat setting because dimensional stability is improved.

Embodiment 2

A film (2) according to Embodiment 2 of the present invention contains
(i) a styrene-based polymer having a syndiotactic structure,
(ii-1) 0.01 to 1.5 mass % of silica particles A2 having an average particle diameter of 0.6 to 3.0 μm and a relative standard deviation of particle diameter of 0.5 or less and
(ii-2) 0.05 to 2.0 mass % of inert fine particles B2 having an average particle diameter of 0.01 to 0.5 μm and a relative standard deviation of particle diameter of 0.5 or less and has a refractive index in the thickness direction of 1.6050 to 1.6550.

The average particle diameter of the silica particles A2 is preferably 0.3 μm or more larger than the average particle diameter of the inert fine particles B2. The inert fine particles B2 are preferably inorganic fine particles. The inert fine particles B2 are preferably spherical silica particles having a particle diameter ratio of 1.0 to 1.3. The silica particles A2 are preferably spherical silica particles having a particle diameter ratio of 1.0 to 1.3. The thickness of the film is preferably not less than 0.4 μm and less than 6.5 μm. The present invention includes a capacitor comprising the film (2).

(Styrene-Based Polymer)

The styrene-based polymer in the film (2) is as described in the section of "common terms".

(Silica Particles A2)

The film (2) contains 0.01 to 1.5 mass % of silica particles A2 having an average particle diameter of 0.6 to 3.0 μm and a relative standard deviation of particle diameter of 0.5 or less.

The average particle diameter of the silica particles A2 is 0.6 to 3.0 μm, preferably 0.7 to 2.0 μm, more preferably 0.8 to 1.6 µm, particularly preferably 0.9 to 1.3 µm. When the average particle diameter is smaller than 0.6 µm, air removability degrades and windability deteriorates. When the average particle diameter is larger than 3.0 µm, the breakdown voltage lowers, and the growth of the space factor and an increase in the number of insulation defects occur particularly for application in capacitors.

The average particle diameter of the silica particles A2 is preferably 0.3 µm or more larger than the average particle diameter of the inert fine particles B2 which will be described hereinafter. The difference between them is more preferably 0.5 µm or more, particularly preferably 0.7 µm or more. By increasing the difference of average particle diameter, high projections formed by the silica particles A2 are scattered on the surface of the film, whereby air removability between films becomes satisfactory. At the same time, slipperiness between films becomes satisfactory due to the existence of low projections formed by the inert fine particles B2, air removability and slipperiness are well balanced when the film is wound up in a roll form, and a film roll having a good wound form can be obtained even when the film is wound up at a high speed. Thus, the windability of the film is further improved.

The silica particles A2 in the present invention preferably have a sharp particle size distribution. Stated more specifically, the relative standard deviation indicative of the sharpness of the distribution is 0.5 or less. When the relative standard deviation is small, that is, the particle size distribution is sharp, projections on the surface of the film become uniform in height. Thereby, windability becomes high, the numbers of coarse particles and large projections become small, the number of defects decreases, and the breakdown voltage can be improved. When the relative standard deviation is large, the numbers of coarse particles and large projections increase, the number of defects becomes large, and the breakdown voltage lowers disadvantageously. From this point of view, the relative standard deviation indicative of the particle size distribution of the silica particles A2 is preferably 0.4 or less, more preferably 0.3 or less, particularly preferably 0.2 or less.

The content of the silica particles A2 in the film (2) is 0.01 to 1.5 mass %, preferably 0.05 to 1.0 mass %, more preferably 0.1 to 0.5 mass %, much more preferably 0.2 to 0.4 mass %. When the content is lower than 0.01 mass %, air removability degrades and windability deteriorates. When the content is higher than 1.5 mass %, the film surface becomes too rough, chipping resistance deteriorates, and the breakdown voltage lowers. Particularly for application in capacitors, the growth of the space factor occurs disadvantageously.

The silica particles A2 are preferably spherical silica particles which are substantially globular or spherical. When the silica particles A2 are spherical silica particles, the effect of improving windability and the breakdown voltage can be further improved. Stated more specifically, the particle diameter ratio indicative of the sphericity of each particle is preferably 1.0 to 1.3. The particle diameter ratio is more preferably 1.0 to 1.2, particularly preferably 1.0 to 1.1.

Spherical silica particles which are a preferred example of the silica particles A2 and spherical silica particles which are a preferred example of the inert fine particles B2 which will be described hereinafter can be produced by forming a hydrous silica [Si(OH)$_4$] monodispersed sphere (following formula 1) from the hydrolysis of ethyl orthosilicate [Si(OC$_2$H$_5$)$_4$] and dehydrating this hydrous silica monodispersed sphere to grow a silica bond [Si—O—Si] 3-dimensionally (following formula) (bulletin of the Chemical Society of Japan, '81, No. 9, p. 1503).

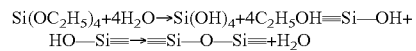

$$Si(OC_2H_5)_4 + 4H_2O \rightarrow Si(OH)_4 + 4C_2H_5OH \equiv Si-OH +$$
$$HO-Si \equiv \rightarrow \equiv Si-O-Si \equiv + H_2O$$

(Inert Fine Particles B2)

The film (2) of the present invention further contains inert fine particles B2 in addition to the above-described silica particles A2. When the film (2) contains the inert fine particles B2, its slipperiness is improved, whereby its windability becomes excellent and its breakdown voltage becomes high.

The average particle diameter of the inert fine particles B2 is 0.01 to 0.5 µm, preferably 0.05 to 0.5 µm, more preferably 0.1 to 0.5 µm, much more preferably 0.2 to 0.4 µm. When the average particle diameter is smaller than 0.01 µm, satisfactory slipperiness is not obtained, that is, satisfactory windability is not obtained. When the average particle diameter is larger than 0.5 µm, low projections on the surface of the film become too high, whereby slipperiness becomes too high and telescoping readily occurs at the time of winding. Further, chipping resistance degrades, and the breakdown voltage lowers disadvantageously. As described above, the average particle diameter of the inert fine particles B2 is preferably smaller than the average particle diameter of the silica particles A2, and the difference between them is preferably 0.3 µm or more.

The inert fine particles B2 in the present invention must have a sharp particle size distribution from the same point of view as the above-described silica particles A2. The relative standard deviation indicative of the sharpness of the distribution is preferably 0.5 or less. The relative standard deviation of the particle diameter of the inert fine particles B2 is preferably 0.4 or less, more preferably 0.3 or less, particularly preferably 0.2 or less.

Further, the content of the inert fine particles B2 in the film (2) is preferably 0.05 to 2.0 mass %. When the content is low, slipperiness degrades, and when the content is lower than 0.05 mass %, satisfactory slipperiness is not obtained. When the content is high, the breakdown voltage tends to lower probably because the frequency of forming voids by the particles becomes high. Further, slipperiness tends to become too high, thereby readily causing telescoping at the time of winding. From this point of view, the content of the inert fine particles B2 is preferably 0.1 to 1.0 mass %, more preferably 0.1 to 0.6 mass %, particularly preferably 0.1 to 0.3 mass %.

Various fine particles may be used as the inert fine particles B2.

Organic fine particles such as crosslinked polystyrene resin particles, crosslinked silicone resin particles, crosslinked acrylic resin particles, crosslinked styrene-acrylic resin particles, crosslinked divinyl benzene-acrylic resin particles, crosslinked polyester resin particles, polyimide resin particles and melamine resin particles may be used.

Inorganic fine particles such as (1) silicon dioxide (including hydrate, quartz sand and quartz); (2) alumina in various crystal forms; (3) silicates containing not less than 30 mass % of a SiO$_2$ component (for example, amorphous or crystalline clay minerals, alumino silicate (including baked product and hydrate), chrysotile asbestos, zircon and fly-ash); (4) oxides of Mg, Zn, Zr and Ti; (5) sulfates of Ca and Ba; (6) phosphates of Li, Ba and Ca (including monohydrogen salts and dihydrogen salts); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (for example, carbon black and graphite); (12) glass (for example, glass powders and glass beads); (13) carbonates of Ca and Mg; (14) fluorite; and (15) spinel type oxides may be used. Out of these, inorganic fine particles are preferred, calcium carbonate particles and silica particles are more preferred, and silica particles are particularly preferred because excellent slipperiness and chipping resistance are obtained.

The inert fine particles B2 are preferably substantially globular or spherical. Stated more specifically, the particle diameter ratio indicative of the sphericity of each particle is preferably 1.0 to 1.3, more preferably 1.0 to 1.2, much more preferably 1.0 to 1.1. When the inert fine particles B2 are made more globular, the breakdown voltage can be made higher. Therefore, the inert fine particles B2 are particularly preferably spherical silica particles like the particularly preferred type of the above-described inert fine particles B2. The spherical silica particles can be obtained by the above-described production method.

In the present invention, besides the silica particles A2 and the inert fine particles B2 both of which are essential to attaining the object of the present invention, different inert particles such as fine particles or inorganic filler which differs from the above particles in type or particle diameter may be contained as long as they do not prevent the object of the present invention from being attained. When the different inert particles are contained, the content of the inert particles is preferably not more than 4.0 mass %, more preferably not more than 2.5 mass %, much more preferably not more than 1.0 mass %, particularly preferably less than 0.5 mass %. When the content of the different inert particles is high, the abrasion resistance of the surface of the film degrades disadvantageously and the breakdown voltage may lower.

The method of containing the above particles used in the present invention is not particularly limited if they are contained in the final film. For example, they are added or deposited in any step during the polymerization of the styrene-based monomer, or they are added in any step for melt extrusion. To disperse these particles effectively, a dispersant or a surfactant may be used.

In the film (2), spherical silica particles are particularly preferably used as the silica particles A2 and the inert fine particles B2. Even when two different types of spherical silica particles are used, since the average particle diameters of these particles fall within specific ranges which do not overlap with each other and the relative standard deviations of the particle diameters of the particles fall within specific ranges, the two different types of particles show two particle size peaks which can be clearly distinguished from each other in their particle size distribution curves. That is, the silica particles A2 and the inert fine particles B2 can be clearly distinguished from each other. When two particle size peaks overlap with each other at their skirt portions to form a valley portion, the valley portion is dissolved into two particle size peaks with a point having the minimum value in the valley portion as the boundary therebetween.

(Other Additives)

Other additives which may be added to the film (2) are as described in the section of "common terms".

(Refractive Index in Thickness Direction)

The film (2) of the present invention has a refractive index in the thickness direction of 1.6050 to 1.6550, preferably 1.6100 to 1.6450, more preferably 1.6150 to 1.6350, much more preferably 1.6200 to 1.6250. When the refractive index in the thickness direction is lower than 1.6050, the breakdown voltage becomes low. Further, the film is readily broken in the production process of a capacitor and is thus inferior in handling properties. Moreover, a capacitor having stable quality cannot be obtained due to nonuniformity in the thickness of the film. When a film having a refractive index in the thickness direction of more than 1.6550 is to be produced, film breakage occurs frequently in the film production process and it is extremely difficult to obtain a film.

To set the refractive index in the thickness direction to the above range, special conditions which will be described hereinafter are required. That is, the refractive index in the thickness direction in the present invention is achieved by dividing the stretching temperature for stretching in a direction perpendicular to the monoaxial direction after the film is stretched in the monoaxial direction into a plurality of stages and making a temperature difference between the temperature of the first stage and the temperature of the last stage which will be described hereinafter.

(Film Thickness)

The thickness of the film (2) is preferably not less than 0.4 µm and less than 6.5 µm, more preferably not less than 0.5 µm and less than 5.5 µm, much more preferably not less than 0.6 µm and less than 4.5 µm, particularly preferably not less than 1.01 µm and less than 3.5 µm. When the thickness of the film is less than 0.4 µm, film breakage readily occurs and the handling properties of the film tend to deteriorate. When the thickness of the film is not less than 6.5 µm, the capacitance tends to lower due to a prolonged distance between the electrodes of a capacitor.

When the film is used as an insulator for capacitors, as the thickness of the film becomes smaller, the capacitance of a capacitor becomes higher advantageously. However, when the thickness of the film is actually reduced, the film is readily wrinkled or broken, thereby reducing its handling properties. Further, the added particles readily fall off with the result that the breakdown voltage lowers. Moreover, when the film becomes thin, such a problem occurs that the absolute value of breakdown voltage becomes small. Therefore, balancing them becomes essential. In the present invention, a novel highly insulating film containing specific particles and having a specific orientation structure is obtained by a special production method which will be described hereinafter without causing the above problems even when the film is made thin.

(Center Line Average Surface Roughness: Ra)

The center line average surface roughness (Ra) of the film (2) is preferably 11 to 89 nm. When the center line average surface roughness (Ra) is not less than 11 nm, slipperiness becomes high, thereby improving work efficiency. Further, when the film is wound up in a roll form, blocking is suppressed and a roll having a good wound form is easily obtained. When the center line average roughness (Ra) is not more than 89 nm, telescoping hardly occurs. From this point of view, the lower limit of the center line average surface roughness (Ra) is preferably 21 nm, more preferably 31 nm. The upper limit of the center line average surface roughness (Ra) is preferably 79 nm, more preferably 69 nm, particularly preferably 59 nm.

(10-Point Average Roughness: Rz)

The 10-point average roughness (Rz) of the film (2) is preferably 900 to 3,000 nm. When the 10-point average roughness (Rz) is not less than 900 nm and the film is wound up in a roll form, the horizontal slippage of the film is suppressed, thereby improving its windability. When the 10-point average roughness (Rz) is set to not more than 3,000 nm, the breakdown voltage can be made higher. From this point of view, the lower limit of the 10-point average roughness (Rz) is preferably 950 nm, more preferably 1,050 nm, particularly preferably 1,250 nm. The upper limit of the 10-point average roughness (Rz) is preferably 2,600 nm, more preferably 2,250 nm, much more preferably 1,950 nm. When the film is thin, as it is not stiff as compared with a thick film, its windability tends to become lower. Therefore, it is particularly effective to set the 10-point average roughness (Rz) to the above range.

(Method of Manufacturing Film (2))

The film (2) of the present invention can be basically manufactured by a conventionally known method or a method which has been accumulated in the industry except for some special conditions. A detailed description is subsequently given of the method of producing the film (2).

First, a resin composition comprising a styrene-based polymer having a syndiotactic structure as the main component is molten by heating to form an unstretched sheet. Stated more specifically, the resin composition is molten by heating at a temperature of its melting point (Tm, unit: ° C.) to (Tm+70° C.), extruded into a sheet form and solidified by cooling to obtain an unstretched sheet. The obtained unstretched sheet preferably has an intrinsic viscosity of 0.35 to 0.9 dl/g.

Thereafter, this unstretched sheet is stretched in biaxial directions. Stretching may be carried out in both the longitudinal direction (mechanical axis direction) and the transverse direction (direction perpendicular to the mechanical axis direction) at the same time or sequentially in any order. For example, in the case of sequential stretching, the film is first stretched to 2.7 to 4.9 times, preferably 2.8 to 4.6 times, more preferably 2.9 to 4.1 times, particularly preferably 3.3 to 3.8 times at a temperature of (glass transition point temperature (Tg, unit: ° C.)–10° C.) to (Tg+70° C.) in a monoaxial direction. The film is then stretched to 2.7 to 5.0 times, preferably 2.9 to 4.7 times, more preferably 3.0 to 4.3 times, particularly preferably 3.5 to 3.9 times at a temperature of Tg to (Tg+80° C.) in a direction perpendicular to the monoaxial direction.

Stretching in the direction perpendicular to the above monoaxial direction becomes difficult probably due to crystallization which proceeds by stretching in the previous stage, whereby film breakage readily occurs during film formation. Particularly when a thin film is to be produced and the draw ratio exceeds 3.2 times, breakage readily occur. When a countermeasure against it was studied, it was found that it is effective to divide the stretching temperature into a plurality of stages without fixing it and make a temperature difference between the temperature of the first stage and the temperature of the last stage. As for the temperature difference, the temperature of the last stage is preferably 4° C. or more, more preferably 7° C. or more, much more preferably 11° C. or more, particularly preferably 20° C. or more higher than the temperature of the first stage. When the temperature difference is too large, stretchability degrades and the thickness nonuniformity of the film after stretching becomes large disadvantageously. The upper limit of the temperature difference is preferably 49° C., more preferably 39° C., particularly preferably 29° C. When the temperature difference between the first stage and the last stage is set to the above range, a high draw ratio which has been difficult to be achieved in the formation of a thin film can be achieved. Thereby, a film having little nonuniformity in thickness can be obtained and the refractive index in the thickness direction of the present invention can be achieved. Further, even when the film is made thin, breakage hardly occurs, thereby making it possible to achieve the preferred film thickness in the present invention.

To make a temperature difference between the first stage and the last stage in the step of carrying out stretching in the direction perpendicular to the monoaxial direction, a temperature difference may be made between the inlet (first stage) and outlet (last stage) of one stretching zone or between the first stretching zone (first stage) and the last stretching zone (last stage) by providing two or more continuous stretching zones having different temperatures. The "zone" refers to one area partitioned by a shutter or the like in a tenter or the like. In either case, it is preferred that the section between the first stage and the last stage should be further divided so that the temperature is increased from the first stage toward the last stage obliquely, particularly linearly. For example, when there are two or more continuous stretching zones having different temperatures, preferably one or more, more preferably 1 to 10 stretching zones are provided between the first stretching zone and the last stretching zone. It is disadvantageous from the viewpoint of equipment cost that the total number of stretching zones is 13 or more. When the film is to be stretched in the transverse direction, the value obtained by dividing the width of the film right after it comes out from the last stage by the width of the film right before it enters the first stage should become the target draw ratio, and the width of the film is preferably increased obliquely, particularly linearly. Even when the film is to be stretched in the longitudinal direction and the transverse direction at the same time, the stretching temperature is divided into a plurality of stages and a temperature difference is made between the temperature of the first stage and the temperature of the last stage likewise.

Thereafter, the film (2) is heat set at a temperature of (Tg+70° C.) to Tm. The heat setting temperature is preferably 200 to 260° C., more preferably 220 to 250° C., much more preferably 230 to 240° C. When the heat setting temperature is too high and a thin film is to be produced, breakage readily occurs and thickness nonuniformity becomes large. It is preferred to carry out relaxation at a temperature 20 to 90° C. lower than the heat setting temperature as required after heat setting because dimensional stability is improved.

Embodiment 3

The film (3) according to Embodiment 3 of the present invention contains
(i) a styrene-based polymer having a syndiotactic structure,
(ii) 0.01 to 5.0 mass % of fine particles having an average particle diameter of 0.01 to 3.0 μm, and
(iii) 3 to 48 mass % of a resin X having a dielectric constant which is 0.2 or more different from that of the styrene-based polymer
and has a refractive index in the thickness direction of 1.6050 to 1.6550.

The melting point of the resin X is preferably in the range of (Tms−30)° C. to (Tms+30)° C. (Tms: melting point of the styrene-based polymer; unit: ° C.).

The resin X is preferably at least one selected from the group consisting of polyethylene terephthalate resin and polyethylene naphthalate resin.

The fine particles include (ii-1) 0.01 to 1.5 mass % of inert fine particles A3 having an average particle diameter of 0.6 to 3.0 μm and a relative standard deviation of particle diameter of 0.5 or less and (ii-2) 0.05 to 2.0 mass % of inert fine particles B3 having an average particle diameter of 0.01 to 0.5 μm and a relative standard deviation of particle diameter of 0.5 or less. The average particle diameter of the inert fine particles A3 is preferably 0.3 μm or more larger than the average particle diameter of the inert fine particles B3. The inert fine particles A3 are preferably spherical particles having a particle diameter ratio of 1.0 to 1.3. The inert fine particles A3 are preferably spherical polymer particles. The inert fine particles A3 are preferably spherical silica particles. The inert fine particles B3 are preferably spherical silica particles having a particle diameter ratio of 1.0 to 1.3. Embodiment 3 includes a capacitor comprising the film (3).

(Styrene-Based Polymer)

The styrene-based polymer in the film (3) is as described in the section of "common terms".

(Fine Particles)

The film (3) of the present invention contains fine particles having an average particle diameter of 0.01 to 3.0 μm. When the average particle diameter of the contained particles falls within this range, handling properties such as windability and workability can be made excellent while excellent electric properties are maintained. When the average particle diameter of the fine particles is too small, handling properties tend to deteriorate. When the average particle diameter is too large, voids in the film become large in size, whereby electric properties tend to deteriorate. From this point of view, the average particle diameter of the fine particles is preferably 0.05 to 2.0 μm, more preferably 0.1 to 1.6 μm, particularly preferably 0.2 to 1.3 μm.

The film (3) contains 0.01 to 5.0 mass % of the fine particles based on 100 mass % of the film (3). When the content of the fine particles is set to the above range, windability and workability can be made excellent while the high breakdown voltage of the film (3) is maintained. From this point of view, the content of the fine particles is preferably 0.1 to 3.5 mass %, more preferably 0.2 to 2.0 mass %, much more preferably 0.3 to 0.7 mass %.

The above fine particles may be either organic fine particles or inorganic fine particles.

The organic fine particles are preferably polymer resin particles such as crosslinked polystyrene resin particles, crosslinked silicone resin particles, crosslinked acrylic resin particles, crosslinked styrene-acrylic resin particles, crosslinked divinyl benzene-acrylic resin particles, crosslinked polyester resin particles, polyimide resin particles or melamine resin particles. Out of these, silicone resin particles and crosslinked polystyrene resin particles are particularly preferred because they are excellent in slipperiness and chipping resistance.

Examples of the inorganic particles include (1) silicon dioxide (including hydrate, quartz sand and quartz); (2) alumina in various crystal forms; (3) silicates containing not less than 30 mass % of a $SiO_2$ component (for example, amorphous or crystalline clay minerals, alumino silicate (including baked product and hydrate), chrysotile asbestos, zircon and fly ash); (4) oxides of Mg, Zn, Zr and Ti; (5) sulfates of Ca and Ba; (6) phosphates of Li, Ba and Ca (including monohydrogen salts and dihydrogen salts); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (for example, carbon black and graphite); (12) glass (for example, glass powders and glass beads); (13) carbonates of Ca and Mg; (14) fluorite; and (15) spinel type oxides. Out of these, calcium carbonate particles and silica particles are preferred and silica particles are particularly preferred because they are excellent in slipperiness and chipping resistance.

In the present invention, one type of fine particles may be contained but it is preferred that two or more different types of fine particles should be contained because the effect of improving handling properties can be made large without reducing the breakdown voltage. In this case, two or more different types of fine particles which differ in composition may be contained, two or more different types of particles which differ in average particle diameter may be contained, two or more different types of fine particles which differ in shape may be contained, or a combination of these fine particles may be contained. It is particularly preferred that two or more different types of fine particles which differ in at least average particle diameter should be contained.

Out of these, particularly preferably, (ii-1) 0.01 to 1.5 mass % of inert fine particles A3 having an average particle diameter of 0.6 to 3.0 μm and a relative standard deviation of particle diameter of 0.5 or less and (ii-2) 0.05 to 2.0 mass % of inert fine particles B3 having an average particle diameter of 0.01 to 0.5 μm and a standard deviation of particle diameter of 0.5 or less are contained as constituent components, and the average particle diameter of the inert fine particles A3 is 0.3 μm or more larger than the average particle diameter of the inert fine particles B3. In this case, the reduction of electric properties by the addition of the fine particles can be minimized and the effect of improving handling properties such as windability and workability can be made larger.

(Inert Fine Particles A3)

The average particle diameter of the inert fine particles A3 is preferably 0.6 to 3.0 μm, more preferably 0.7 to 2.01 μm, much more preferably 0.8 to 1.6 μm, particularly preferably 0.9 to 1.3 μm. When the average particle diameter of the inert fine particles A3 falls within the above range, air removability can be improved, thereby making it possible to increase the effect of improving windability. When the average particle diameter of the inert fine particles A3 is too small, satisfactory air removability may not be obtained, that is, the effect of improving windability becomes small. When the average particle diameter is too large, voids in the film tend to become large in size, that is, the effect of improving electric properties becomes small.

The relative standard deviation of the particle diameter of the inert fine particles A3 is preferably 0.5 or less, more preferably 0.4 or less, much more preferably 0.3 or less, particularly preferably 0.2 or less. When the relative standard deviation of the particle diameter falls within the above range, it means that the particle size distribution of the inert fine particles A3 is sharp and projections on the surface of the film become uniform in height, thereby making it possible to increase the effect of improving windability. The numbers of coarse particles and large projections become small, thereby making it possible to reduce the number of defects and increase the effect of improving the breakdown voltage.

The content of the inert fine particles A3 is preferably 0.01 to 1.5 mass %, more preferably 0.05 to 1.0 mass %, much more preferably 0.1 to 0.5 mass %, particularly preferably 0.2 to 0.4 mass % based on 100 mass % of the film (3). When the content of the inert fine particles A3 falls within the above range, the effect of improving handling properties can be made large while the high breakdown voltage of the film (3) is maintained. When the content of the inert fine particles A3 is too low, air removability tends to degrade, thereby reducing the effect of improving windability. When the content is too high, the surface of the film tends to become too rough, whereby the chipping resistance of the surface of the film is apt to degrade, and the effect of improving the breakdown voltage is reduced. Particularly for application in capacitors, the space factor tends to increase.

The inert fine particles A3 are preferably spherical particles having a particle diameter ratio of 1.0 to 1.3. The particle diameter ratio is more preferably 1.0 to 1.2, particularly preferably 1.0 to 1.1. When the particle diameter ratio falls within the above range, the effect of improving windability and the effect of improving the breakdown voltage can be made large.

The same organic fine particles and inorganic fine particles as the above-described fine particles may be used as the inert fine particles A3.

The organic fine particles are preferably polymer resin particles, particularly preferably silicone resin particles or crosslinked polystyrene resin particles because they are excellent in slipperiness and chipping resistance. These polymer resin particles are preferably spherical as described above, that is, spherical polymer resin particles. Out of these, spherical silicone resin particles and spherical crosslinked polystyrene resin particles are particularly preferred because they are excellent in slipperiness and chipping resistance.

The inorganic fine particles are preferably calcium carbonate particles or silica particles and particularly preferably silica particles, because they are excellent in slipperiness and chipping resistance. These inorganic fine particles are preferably spherical as described above, and spherical silica particles are particularly preferred because they are excellent in slipperiness and chipping resistance.

(Inert Fine Particles B3)

The average particle diameter of the inert fine particles B3 is preferably 0.01 to 0.5 μm, more preferably 0.05 to 0.5 μm, much more preferably 0.1 to 0.5 μm, particularly preferably 0.2 to 0.4 μm. When the average particle diameter of the inert fine particles B3 falls within the above range, appropriate slipperiness can be obtained, that is, the effect of improving windability can be made large. When the average particle diameter of the inert fine particles B3 is too small, satisfactory slipperiness may not be obtained, that is, the effect of improving windability becomes small. When the average particle diameter is too large, low projections on the surface of the film become too high, whereby slipperiness tends to become too high, thereby reducing the effect of improving windability with the result that telescoping readily occurs at the time of winding. Further, chipping resistance tends to degrade, and the effect of improving the breakdown voltage is reduced.

The inert fine particles B3 preferably have a sharp particle size distribution from the same point of view as the above-described inert fine particles A3. The relative standard deviation of the particle diameter of the inert fine particles B3 is preferably 0.5 or less, more preferably 0.4 or less, much more preferably 0.3 or less, particularly preferably 0.2 or less.

The content of the inert fine particles B3 is preferably 0.05 to 2.0 mass %, more preferably 0.1 to 1.0 mass %, much more preferably 0.1 to 0.6 mass %, particularly preferably 0.1 to 0.3 mass % based on 100 mass % of the film (3). When the content of the inert fine particles B3 falls within the above range, the effect of improving handling properties can be made large while the high breakdown voltage of the film (3) is maintained. When the content of the inert fine particles B3 is too low, slipperiness tends to degrade, thereby reducing the effect of improving windability. When the content is too high, the frequency of forming voids tends to increase, thereby reducing the effect of improving the breakdown voltage. Further, slipperiness tends to become too high, thereby reducing the effect of improving windability with the result that telescoping readily occurs at the time of winding.

The inert fine particles B3 are preferably spherical particles having a particle diameter ratio of 1.0 to 1.3, more preferably 1.0 to 1.2, particularly preferably 1.0 to 1.1 from the same point of view as the above-described inert fine particles A3.

The same organic fine particles and inorganic fine particles as the above fine particles may be used as the inert fine particles B3. Out of these, inorganic fine particles are preferred. Calcium carbonate particles and silica particles are preferred and silica particles are particularly preferred because they are excellent in slipperiness and chipping resistance. These inorganic fine particles are preferably spherical as described above, and spherical silica particles are particularly preferred because they are excellent in slipperiness and chipping resistance.

The average particle diameter of the inert fine particles A3 is preferably 0.3 μm or more larger than the average particle diameter of the inert fine particles B3. The difference is more preferably 0.5 μm or more, particularly preferably 0.7 μm or more. When the difference between the average particle diameter of the inert fine particles A3 and the average particle diameter of the inert fine particles B3 is made large, high projections formed by the inert fine particles A3 are scattered over the surface of the film, thereby improving air removability between films. At the same time, low projections formed by the inert fine particles B3 are existent, thereby improving slipperiness between films. Therefore, when the film is wound up in a roll form, air removability and slipperiness are well balanced, thereby increasing the effect of improving windability with the result that a film roll having a good wound form can be obtained even when the film is wound up at a high speed.

The method of containing the fine particles used in the present invention is not limited if they are contained in the final film. For example, they are added or deposited in any step during the polymerization of the styrene-based monomer or added in any step for melt extrusion. To disperse these fine particles effectively, a dispersant or a surfactant may be used.

(Resin X)

The film (3) contains a resin X. The resin X is a resin having a dielectric constant which is 0.2 or more different from the dielectric constant of the above styrene-based polymer. When the resin X is mixed with the styrene-based polymer, the breakdown voltage becomes high probably because the domains of the styrene-based polymer and the resin X share the application voltage. The difference between the dielectric constant of the styrene-based polymer and the dielectric constant of the resin X is preferably 0.4 or more, more preferably 0.5 or more. The breakdown voltage can be made higher by setting the difference to the above range.

The resin X in the present invention preferably has a melting point of (Tms−30) ° C. to (Tms+30) ° C. (Tms: melting point of the styrene-based polymer; unit: ° C.). When the melting point of the resin X falls within the above range and the styrene-based polymer and the resin X are mixed together, they can be mixed together well, that is, the dispersion state of the resin X becomes better and the effect of improving the breakdown voltage becomes large. From this point of view, the melting point of the resin X is in the range of preferably (Tms−20)° C. to (Tms+20)° C., more preferably (Tms−15)° C. to (Tms+15)° C., particularly preferably (Tms−5)° C. to (Tms+5)° C.

When the difference between the melting point of the resin X and the melting point of the styrene-based polymer is 1° C. or more, the effect of improving the breakdown voltage can be made large advantageously probably because the dispersion state of the resin X becomes better. From this point of view, the difference between the melting point of the resin X and the melting point of the styrene-based polymer is more preferably 2° C. or more, particularly preferably 3° C. or more.

Examples of the resin X include polyesters such as polyethylene terephthalate (PET) resin, polyethylene naphthalate (PEN) resin and polybutylene terephthalate (PBT) resin, polyolefins such as polypropylene, polyamides such as nylon 6 and nylon 6,6, polythioethers such as polyphenylene sulfide, polycarbonates, polyacrylates, polysulfones, polyether ether ketones, polyether sulfones, polyimides, halogenated vinyl-based polymers, acrylic polymers such as methyl polymethacrylate, and polyvinyl alcohols. Out of these, polyesters are preferred, polyethylene terephthalate (PET) resin and polyethylene naphthalate (PEN) resin are more preferred, and polyethylene terephthalate (PET) resin is particularly preferred from the viewpoint that they can increase the breakdown voltage.

The film (3) of the present invention is a biaxially oriented film obtained from a resin composition containing 3 to 48 mass % of the resin X. When the resin X is contained in the above amount, the electric properties of the obtained film can be made excellent. Stated more specifically, the breakdown voltage can be made high. From this point of view, the amount of the resin X is preferably 4 to 40 mass %, more preferably 6 to 35 mass %, particularly preferably 9 to 24 mass % based on 100 mass % of the resin composition.

(Other Additives)

Other additives which may be added to the film (3) are as described in the section of "common terms".

(Refractive Index in Thickness Direction)

The film (3) of the present invention has a refractive index in the thickness direction of 1.6050 to 1.6550. The refractive index in the thickness direction is preferably 1.6100 to 1.6400, more preferably 1.6130 to 1.6380, particularly preferably 1.6150 to 1.6360. When the refractive index in the thickness direction is set to the above range, the breakdown voltage can be made high. Further, the frequency of film breakage in the film production process is reduced, thereby making it possible to improve productivity. When the refractive index in the thickness direction is too high, the frequency of film breakage in the film production process tends to increase, thereby reducing the productivity of the film. When the refractive index is too low, the breakdown voltage tends to lower with the result of the deterioration of electric properties. The frequency of film breakage in the capacitor production process increases. Further, the thickness nonuniformity of the film tends to become large, and a capacitor having stable quality cannot be obtained.

To set the refractive index in the thickness direction to the above range, the production method which will be described hereinafter is employed. That is, the refractive index in the thickness direction of the present invention is achieved by dividing the stretching temperature for stretching in the direction perpendicular to the monoaxial direction which is carried out after or at the same time as stretching in the monoaxial direction into a plurality of stages and making a specific temperature difference between the temperature of the first stage and the temperature of the last stage.

(Film Thickness)

The thickness of the film (3) of the present invention is preferably not less than 0.3 μm and less than 12 μm, more preferably not less than 0.4 μm and less than 6.0 μm, much more preferably not less than 0.5 μm and less than 3.5 μm. When the thickness of the film is set to the above range, a capacitor having a high capacitance can be produced.

When the film is used as an insulator for capacitors, as the thickness of the film becomes smaller, the capacitance of a capacitor becomes higher advantageously. However, when the thickness of the film is actually reduced, the film is readily wrinkled or broken. Further, the added particles readily fall off with the result that the breakdown voltage lowers. Moreover, when the film becomes thin, such a problem occurs that the absolute value of the breakdown voltage becomes small. Therefore, balancing them becomes essential. In the present invention, a novel film (3) containing specific particles and having a specific orientation structure is obtained by employing a production method which will be described hereinafter without causing the above problems even when the film is made thin.

(Center Line Average Surface Roughness: Ra)

The center line average surface roughness (Ra) of at least one side of the film (3) is preferably 11 to 89 nm. When the center line average surface roughness (Ra) is set to the above range, the effect of improving windability can be made large. Further, anti-blocking is improved and the appearance of a film roll can be made better. When the surface roughness (Ra) is too low, slipperiness tends to become too low, thereby reducing the effect of improving windability. When the center line average surface roughness (Ra) is too high, slipperiness tends to become too high, thereby reducing the effect of improving windability with the result that telescoping readily occurs at the time of winding. From this point of view, the lower limit of the surface roughness (Ra) is preferably 21 nm, more preferably 31 nm. The upper limit of the surface roughness (Ra) is preferably 79 nm, more preferably 69 nm, particularly preferably 59 nm.

(10-Point Average Roughness: Rz)

The 10-point average roughness (Rz) of at least one side of the film (3) of the present invention is preferably 900 to 3,000 nm. When the 10-point average roughness (Rz) is set to the above range, the effect of improving windability can be made large. When the 10-point average roughness (Rz) is too low and the film is wound up in a roll form, air removability tends to degrade, thereby reducing the effect of improving windability with the result that the film readily slips in the transverse direction. When the film is thin, as it is not stiff, air removability tends to become lower, thereby further reducing the effect of improving windability. When the 10-point average roughness (Rz) is too high, the number of large projections tends to increase and the effect of improving the breakdown voltage becomes small. From this point of view, the lower limit of the 10-point average roughness (Rz) is preferably 950 nm, more preferably 1,050 nm, particularly preferably 1,250 nm. The upper limit of the 10-point average roughness (Rz) is preferably 2,600 nm, more preferably 2,250 nm, particularly preferably 1,950 nm.

(Method of Manufacturing Film (3))

The film (3) of the present invention can be basically obtained by a conventionally known method or a method which has been accumulated in the industry except for some special conditions. A detailed description is subsequently given of the method of producing the film (3) of the present invention.

First, a resin composition comprising a styrene-based polymer having a syndiotactic structure as the main component and a predetermined amount of a resin X is molten by heating to form an unstretched sheet. Stated more specifically, the resin composition is molten by heating at a temperature of its melting point (Tm, unit: ° C.) to (Tm+70° C.), extruded into a sheet form and solidified by cooling to obtain an unstretched sheet.

Thereafter, this unstretched sheet is stretched in biaxial directions. Stretching may be carried out in both the longitudinal direction (mechanical axis direction) and the transverse direction (direction perpendicular to the mechanical axis direction) at the same time or sequentially in any order. For example, in the case of sequential stretching, the film is first stretched to 2.7 to 4.8 times, preferably 2.9 to 4.4 times, more preferably 3.1 to 4.0 times at a temperature of (glass transition point temperature of the resin composition (Tg, unit: ° C.)−10° C.) to (Tg+70° C.) in a monoaxial direction. The film is then stretched to 2.8 to 4.9 times, preferably 3.0 to 4.5 times, more preferably 3.2 to 4.1 times at a temperature of Tg to (Tg+80° C.) in a direction perpendicular to the monoaxial direction.

Stretching in the direction perpendicular to the above monoaxial direction becomes difficult probably due to crystallization which proceeds by stretching in the previous stage, whereby film breakage readily occurs during film formation. Particularly when a thin film is to be produced and the draw ratio exceeds 3.2 times, breakage readily occurs.

When a countermeasure against it was studied, it was found that it is effective to set the stretching rate for stretching in the direction perpendicular to the above monoaxial direction to a predetermined range. That is, when the stretching rate is too fast, the high-order structural change of the molecule by stretching cannot follow the speed of change in the shape of the film by stretching, whereby the high-order structure is apt to be distorted and film breakage readily occurs. When the stretching rate is too slow, the crystallization of the film precedes during stretching and stretching nonuniformity and thickness nonuniformity tend to be produced probably due to variations in stretching stress, whereby breakage readily occurs. From this point of view, the stretching rate is preferably not less than 500%/min, more preferably not less than 1,000%/min, much more preferably not less than 2,000%/min, particularly preferably not less than 4,000%/min. The stretching rate is preferably not more than 30,000%/min, more preferably not more than 15,000%/min, much more preferably not more than 9,000%/min, particularly preferably not more than 6,000%/min.

It was further found that it is effective to divide the stretching temperature for stretching in the direction perpendicular to the monoaxial direction into a plurality of stages without fixing it and make a temperature difference between the temperature of the first stage and the temperature of the last stage. As for the temperature difference, the temperature of the last stage is preferably 4° C. or more, more preferably 7° C. or more, much more preferably 11° C. or more, particularly preferably 15° C. or more higher than the temperature of the first stage. The temperature difference is preferably 49° C. or less, more preferably 39° C. or less, much more preferably 29° C. or less, particularly preferably 20° C. or less. When the temperature difference is too large, film breakage readily occurs, and the thickness nonuniformity of the film after stretching tends to become large. When the temperature difference between the first stage and the last stage is set to the above range, a high draw ratio which has been difficult to be achieved in the formation of a thin film can be achieved. Thereby, a film having little nonuniformity in thickness can be obtained, and the refractive index in the thickness direction of the present invention can be achieved. Further, even when the film is made thin, breakage hardly occurs, thereby making it possible to achieve the preferred film thickness in the present invention.

To make a temperature difference between the first stage and the last stage in the step of carrying out stretching in the direction perpendicular to the monoaxial direction, a temperature difference may be made between the inlet (first stage) and outlet (last stage) of one stretching zone or between the first stretching zone (first stage) and the last stretching zone (last stage) by providing two or more continuous stretching zones having different temperatures. The "zone" refers to one area partitioned by a shutter or the like in a tenter or the like. In either case, it is preferred that the section between the first stage and the last stage should be further divided so that the temperature is increased from the first stage toward the last stage obliquely, particularly linearly. For example, when there are two or more continuous stretching zones having different temperatures, preferably one or more, more preferably 1 to 10 stretching zones are provided between the first stretching zone and the last stretching zone. It is disadvantageous from the viewpoint of equipment cost that the total number of stretching zones is 13 or more. When the film is to be stretched in the transverse direction, the value obtained by dividing the width of the film right after it comes out from the last stage by the width of the film right before it enters the first stage should become the target draw ratio, and the width of the film is preferably increased obliquely, particularly linearly. Even when the film is to be stretched in the longitudinal direction and the transverse direction at the same time, the stretching temperature is divided into a plurality of stages and a temperature difference is made between the temperature of the first stage and the temperature of the last stage likewise.

At least one of the above stretching rate and the stretching temperature is adopted in the present invention but it is more preferred to adopt both of them so that the stretching step is stabilized and the refractive index and the preferred film thickness in the present invention are easily achieved.

Thereafter, the film (3) is heat set at a temperature of (Tg+70° C.) to Tm. The heat setting temperature is 200 to 260° C., preferably 220 to 250° C., more preferably 230 to 240° C. When the heat setting temperature is too high and a thin film is to be produced, film breakage readily occurs and thickness nonuniformity becomes large. When relaxation is carried out at a temperature 20 to 90° C. lower than the heat setting temperature as required after heat setting, dimensional stability is improved.

Embodiment 4

The film (4) according to Embodiment 4 of the present invention contains
(i) a styrene-based polymer having a syndiotactic structure,
(ii) 0.01 to 1.5 mass % of inert fine particles A4 having an average particle diameter of 0.2 to 3.0 μm and a relative standard deviation of particle diameter of 0.5 or less, and
(iii) 0.1 to 8 mass % of an antioxidant
and has a refractive index in the thickness direction of 1.6050 to 1.6550.

The film (4) preferably contains 0.05 to 2.0 mass % of inert fine particles B4 having an average particle diameter of 0.01 to 0.5 μm which is 0.2 μm or more smaller than the average particle diameter of the inert fine particles A4 and a relative standard deviation of particle diameter of 0.5 or less.

The inert fine particles A4 are preferably spherical particles having a particle diameter ratio of 1.0 to 1.3. The inert fine particles A4 are preferably spherical polymer particles. The inert fine particles A4 are preferably spherical silica particles. The inert fine particles B4 are preferably spherical silica particles having a particle diameter ratio of 1.0 to 1.3. The thermal decomposition temperature of the antioxidant is preferably 250° C. or higher. The film (4) is preferably as thick as not less than 0.4 μm and less than 6.5 μm. The present invention includes a capacitor comprising the film (4).
(Styrene-Based Polymer)

The styrene-based polymer in the film (4) is as described in the section of "common terms".
(Antioxidant)

Since the film (4) of the present invention contains an antioxidant, its breakdown voltage can be made high.

The antioxidant may be either a primary antioxidant which prevents oxidation by capturing the formed radical or a secondary antioxidant which prevents oxidation by decomposing the formed peroxide. Examples of the primary antioxidant include phenol-based antioxidants and amine-based antioxidants. Examples of the secondary antioxidant include phosphorus-based antioxidants and sulfur-based antioxidants.

The phenol-based antioxidants include monophenol-based antioxidants such as 2,6-di-t-butyl-4-methylphenol, 2,6-di-t-butyl-4-ethylphenol, 2-t-butyl-4-methoxyphenol, 3-t-butyl-4-methoxyphenol, 2,6-di-t-butyl-4-[4,6-bis(octylthio)-1,3,5-triazin-2-ylamino]phenol and n-octadecyl-3-(3,5-di-t-butyl-4-hydroxyphenyl)propionate Bisphenol-based antioxidants such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), N,N'-bis[3-(3,5-di-t-butyl-4-hydroxyphenyl)propionyl]hydrazine, N,N'-hexane-1,6-diylbis[3-(3,5-di-t-butyl-4-hydroxyphenyl)propionamide] and 3,9-bis[1,1-dimethyl-2-[β-(3-t-butyl-4-hydroxy-5-methylphenyl)propionyloxy]ethyl]2,4,8,10-tetraoxaspiro[5.5]undecane are also included.

Phenol-based antioxidants such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, pentaerythritol tetrakis[3-(3,5-di-t-butyl-4-hydroxyphenyl)propionate], bis[3,3-bis-(4-hydroxy-3-t-butylphenyl)butyric acid]glycol ester, 1,3,5-tris(3',5'-di-t-butyl-4'-hydroxybenzyl)-sec-triazine-2,4,6-(1H,3H,5H)trione and d-α-tocopherol are further included.

The amine-based antioxidants include alkyl-substituted diphenylamines.

The phosphorus-based antioxidants include triphenyl phosphite, diphenylisodecyl phosphite, phenyldiisodecyl phosphite, 4,4'-butylidene-bis(3-methyl-6-t-butylphenylditridecyl)phosphite, octadecyl phosphite, tris(nonylphenyl)phosphite, diisodecyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-t-butylphenyl)phosphite, cyclic neopentane tetraylbis(2,4-di-t-butylphenyl) phosphite, cyclic neopentane tetraylbis(2,6-di-t-butyl-4-methylphenyl)phosphite and 2,2'-methylenebis(4,6-di-t-butylphenyl)octyl phosphite.

The sulfur-based antioxidants include dilauryl-3,3'-thiodipropionate, dimyristyl-3,3'-thiodipropionate, distearyl-3,3'-thiodipropionate, pentaerythritol tetrakis(3-laurylthiopropionate) and 2-mercaptobenzimidazole.

The antioxidant is preferably a primary antioxidant, particularly preferably a phenol-based antioxidant because it has excellent corrosion resistance and can increase the effect of improving the breakdown voltage.

The antioxidant preferably has a thermal decomposition temperature of 250° C. or higher. When the thermal decomposition temperature is too low, the antioxidant itself thermally decomposes at the time of melt extrusion, whereby such a problem readily occurs that the step is contaminated or the polymer is colored yellow disadvantageously. From this point of view, the thermal decomposition temperature of the antioxidant is more preferably 280° C. or higher, much more preferably 300° C. or higher, particularly preferably 320° C. or higher. Preferably, the antioxidant in the present invention hardly thermally decomposes, and the thermal decomposition temperature is preferably higher. In fact, the upper limit of the thermal decomposition temperature is about 500° C.

The melting point of the antioxidant is preferably 90° C. or higher. When the melting point is too low, the antioxidant melts before the polymer at the time of melt extrusion, and the polymer tends to slip in the supply portion of the screw of an extruder. Thereby, the supply of the polymer becomes unstable, causing such a problem that the thickness nonuniformity of the film becomes large. From this point of view, the lower limit of the melting point of the antioxidant is more preferably 120° C., much more preferably 150° C., particularly preferably 200° C. When the melting point of the antioxidant is too high, the antioxidant hardly melts at the time of melt extrusion, whereby the dispersion of the antioxidant in the polymer tends to deteriorate. Thereby, such a problem occurs that the effect obtained by adding the antioxidant appears only locally. From this point of view, the upper limit of the melting point of the antioxidant is preferably 300° C., more preferably 250° C., much more preferably 220° C., particularly preferably 170° C.

Commercially available products of the antioxidant may be used as they are. The commercially available products include pentaerythritol tetrakis[3-(3,5-di-t-butyl-4-hydroxyphenyl)propionate] (IRGANOX1010 "tradename" of Ciba Specialty Chemicals Holding Inc.), N,N'-bis[3-(3,5-di-t-butyl-4-hydroxyphenyl)propionyl]hydrazine (IRGANOX1024 "tradename" of Ciba Specialty Chemicals Holding Inc.), and N,N'-hexane-1,6-diylbis[3-(3,5-di-t-butyl-4-hydroxyphenyl)propionamide] (IRGANOX1098 "tradename" of Ciba Specialty Chemicals Holding Inc.).

The film (4) of the present invention contains the above antioxidant in an amount of 0.1 to 8 mass % based on the mass of the film (4). When the content of the antioxidant is set to the above range, the breakdown voltage becomes high. When the content of the antioxidant is too low, the effect obtained by adding the antioxidant becomes unsatisfactory and the breakdown voltage tends to lower, thereby deteriorating electric properties. From this point of view, the lower limit of the content of the antioxidant is preferably 0.2 mass %, more preferably 0.5 mass %, much more preferably 1 mass %. When the content is too high, the antioxidant tends to agglomerate in the film, thereby increasing the number of defects caused by the antioxidant and reducing the breakdown voltage. From this point of view, the upper limit of the content of the antioxidant is preferably 7 mass %, more preferably 5 mass %, much more preferably 3 mass %.

The above antioxidants may be used alone or in combination of two or more. When two or more antioxidants are used in combination, two or more primary antioxidants may be used, two or more secondary antioxidants may be used, or one or more primary antioxidants and one or more secondary antioxidants may be used in combination. For example, when one primary antioxidant and one secondary antioxidant are used in combination, the prevention of both primary oxidation and secondary oxidation can be expected. In the present invention, use of one primary antioxidant or two or more primary antioxidants is preferred because the effect of improving the breakdown voltage can be made large, and use of one phenol-based antioxidant or two or more phenol-based antioxidants is particularly preferred.

(Inert Fine Particles A4)

The film (4) of the present invention contains inert fine particles A4. The average particle diameter of the inert fine particles A4 is 0.2 to 3.0 μm. When the average particle diameter of the inert fine particles A4 is set to the above range, the air removability of the film can be made excellent while a high breakdown voltage is maintained, thereby making it possible to obtain a film (4) having excellent windability. When the average particle diameter of the inert fine particles A4 is too small, sufficiently high air removability may not be obtained, thereby reducing windability. When the average particle diameter is too large, voids in the film tend to become large in size, thereby reducing the breakdown voltage. From this point of view, the average particle diameter of the inert fine particles A4 is preferably 0.25 to 2.0 μm, more preferably 0.4 to 1.6 μm, particularly preferably 1.0 to 1.2 μm.

The relative standard deviation of the particle diameter of the inert fine particles A4 is 0.5 or less. When the relative standard deviation of the particle diameter is set to the above range, projections on the surface of the film become uniform in height, and a film (4) having excellent windability can be obtained. The numbers of coarse particles and large projections become small, and a film (4) having a high breakdown voltage can be obtained. From this point of view, the relative standard deviation of the particle diameter of the inert fine particles A4 is preferably 0.4 or less, more preferably 0.3 or less, particularly preferably 0.2 or less.

The inert fine particles A4 are preferably spherical particles having a particle diameter ratio of 1.0 to 1.3. The particle diameter ratio is more preferably 1.0 to 1.2, particularly preferably 1.0 to 1.1. When the particle diameter ratio falls within the above range, the effect of improving windability and the effect of improving the breakdown voltage can be made larger.

The content of the inert fine particles A4 is 0.01 to 1.5 mass % based on 100 mass % of the film (4). When the content of the inert fine particles A4 is set to the above range, the handling properties of the film can be made excellent while a high breakdown voltage is maintained. When the content of the inert fine particles A4 is too low, air removability tends to deteriorate, thereby reducing windability. When the content is too high, the surface of the film tends to become too rough, whereby the chipping resistance of the surface of the film is apt to degrade, and the breakdown voltage lowers. Particularly for application in capacitors, the space factor tends to increase. From this point of view, the content of the inert fine particles A4 is preferably 0.05 to 1.0 mass %, more preferably 0.1 to 0.5 mass %, particularly preferably 0.2 to 0.4 mass %.

The above inert fine particles A4 may be either organic fine particles or inorganic fine particles.

The organic fine particles include polymer resin particles such as polystyrene resin particles, silicone resin particles, acrylic resin particles, styrene-acrylic resin particles, divinyl benzene-acrylic resin particles, polyester resin particles, polyimide resin particles and melamine resin particles. Out of these, silicone resin particles and polystyrene resin particles are particularly preferred because they are excellent in slipperiness and chipping resistance. These polymer resin particles are preferably spherical as described above, that is, spherical polymer resin particles. Out of these, spherical silicone resin particles and spherical polystyrene resin particles are particularly preferred because they are excellent in slipperiness and chipping resistance.

The inorganic particles include (1) silicon dioxide (including hydrate, quartz sand and quartz); (2) alumina in various crystal forms; (3) silicates containing not less than 30 mass % of a $SiO_2$ component (for example, amorphous or crystalline clay minerals, alumino silicate (including baked product and hydrate), chrysotile asbestos, zircon and fly ash); (4) oxides of Mg, Zn, Zr and Ti; (5) sulfates of Ca and Ba; (6) phosphates of Li, Ba and Ca (including monohydrogen salts and dihydrogen salts); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (for example, carbon black and graphite); (12) glass (for example, glass powders and glass beads); (13) carbonates of Ca and Mg; (14) fluorite; and (15) spinel type oxides. Out of these, calcium carbonate particles and silica particles are preferred, and silica particles are particularly preferred because they are excellent in slipperiness and chipping resistance. The inorganic fine particles are preferably spherical as described above, and spherical silica particles are particularly preferred because they are more excellent in slipperiness and chipping resistance.

(Inert Fine Particles B4)

The film (4) preferably contains inert fine particles B4 having an average particle diameter and a relative standard deviation of particle diameter both of which fall within specific ranges, besides the inert fine particles A4.

The average particle diameter of the inert fine particles B4 is preferably 0.01 to 0.5 μm. When the average particle diameter of the inert fine particles B4 is set to the above range, appropriate slipperiness can be obtained, thereby making it possible to increase the effect of improving windability. When the average particle diameter of the inert fine particles B4 is too small, slipperiness is apt to degrade, thereby reducing the effect of improving windability. When the average particle diameter is too large, low projections on the surface of the film tend to become too high, whereby slipperiness becomes too high, thereby reducing the effect of improving windability with the result that telescoping readily occurs at the time of winding. Further, chipping resistance tends to degrade, and the effect of improving the breakdown voltage is reduced. From this point of view, the average particle diameter of the inert fine particles B4 is preferably 0.05 to 0.5 μm, more preferably 0.08 to 0.4 μm, much more preferably 0.1 to 0.3 μm.

The average particle diameter of the inert fine particles B4 is preferably 0.2 μm or more smaller than the average particle diameter of the inert fine particles A4. By setting the difference between the average particle diameter of the inert fine particles A4 and the average particle diameter of the inert fine particles B4 to the above range, high projections formed by the inert fine particles A4 are scattered over the surface of the film, thereby improving air removability between films. At the same time, low projections formed by the inert fine particles B4 are existent, thereby improving slipperiness between films. Therefore, when the film is wound up in a roll form, air removability and slipperiness are well balanced, thereby increasing the effect of improving windability with the result that a film roll having a good wound form can be obtained even when the film is wound at a high speed. From this point of view, the average particle diameter of the inert fine particles B4 is more preferably 0.4 μm or more, much more preferably 0.6 μm or more, particularly preferably 0.8 μm or more smaller than the average particle diameter of the inert fine particles A4.

The relative standard deviation of the particle diameter of the inert fine particles B4 is 0.5 or less from the same point of view as the above-described inert fine particles A4. The relative standard deviation of the particle diameter of the inert fine particles B4 is preferably 0.4 or less, much more preferably 0.3 or less, particularly preferably 0.2 or less.

The inert fine particles B4 in the present invention are spherical particles having a particle diameter ratio of preferably 1.0 to 1.3, more preferably 1.0 to 1.2, particularly preferably 1.0 to 1.1 from the same point of view as the above-described inert fine particles A4.

The film (4) of the present invention preferably contains the inert fine particles B4 in an amount of 0.05 to 2.0 mass % based on 100 mass % of the film (4). When the content of the inert fine particles B4 is set to the above range, the effect of improving the handling properties of the film can be made large while a high breakdown voltage can be maintained. When the content of the inert fine particles B4 is too low, slipperiness tends to degrade, thereby reducing the effect of improving windability. When the content is too high, the frequency of forming voids in the film tends to increase, thereby reducing the effect of improving the breakdown voltage. Further, slipperiness tends to become too high, thereby reducing the effect of improving windability with the result that telescoping readily occurs at the time of winding. From this point of view, the content of the inert fine particles B4 is more preferably 0.1 to 1.0 mass %, much more preferably 0.1 to 0.5 mass %, particularly preferably 0.1 to 0.3 mass %.

The same organic fine particles and inorganic fine particles as the above-described inert fine particles A4 may be used as the inert fine particles B4. Out of these, inorganic fine particles are preferred, calcium carbonate particles and silica particles are more preferred, and silica particles are particularly preferred because they are excellent in slipperiness and chipping resistance. These inorganic fine particles are preferably spherical as described above, and spherical silica particles are particularly preferred because they are excellent in slipperiness and chipping resistance.

The method of containing the inert fine particles A4 and the inert fine particles B4 is not limited if they are contained in the final film. For example, they are added or deposited in any step during the polymerization of the styrene-based monomer or added in any step for melt extrusion. To disperse these fine particles effectively, a dispersant or a surfactant may be used.

In the present invention, spherical silica particles are particularly preferably used as the inert fine particles A4 and the inert fine particles B4. Even in this case, since the average particle diameters of these particles fall within specific ranges which do not overlap with each other and the relative standard deviations of the particle diameters of the particles are small, the two different types of particles show two particle size peaks which can be clearly distinguished from each other in their particle size distribution curves. That is, the inert fine particles A4 and the inert fine particles B4 can be clearly distinguished from each other. When two particle size peaks overlap with each other at their skirt portions to form a valley portion, the valley portion is dissolved into two particle size peaks with a point having the minimum value in the valley portion as the boundary therebetween.

(Other Additives)

Other additives which may be added to the film (4) are as described in the section of "common terms".

(Refractive Index in Thickness Direction)

The film (4) of the present invention has a refractive index in the thickness direction of 1.6050 to 1.6550. The refractive index in the thickness direction is preferably 1.6100 to 1.6400, more preferably 1.6130 to 1.6380, particularly preferably 1.6150 to 1.6360. When the refractive index in the thickness direction is set to the above range, the breakdown voltage can be made high. Further, the frequency of film breakage in the film production process is reduced, thereby making it possible to improve productivity. When the refractive index in the thickness direction is too high, the frequency of film breakage in the film production process tends to increase, thereby reducing the productivity of the film. When the refractive index is too low, the breakdown voltage tends to lower with the result of the deterioration of electric properties. Further, the frequency of film breakage in the capacitor production process increases, thereby reducing the productivity of the capacitor. Moreover, the thickness nonuniformity of the film tends to become large, and a capacitor having stable quality is hardly obtained.

To set the refractive index in the thickness direction to the above range, the production method which will be described hereinafter is employed. That is, the preferred refractive index in the thickness direction of the present invention is achieved by setting the draw ratio of the film to a specific range which will be described hereinafter, dividing the stretching temperature for stretching in the direction perpendicular to the monoaxial direction which is carried out after stretching in the monoaxial direction into a plurality of stages and making a specific temperature difference between the temperature of the first stage and the temperature of the last stage in the stretching step.

(Film Thickness)

The thickness of the film (4) is preferably not less than 0.4 µm and less than 6.5 µm. It is more preferably not less than 0.4 µm and less than 6.01 µm, particularly preferably not less than 0.5 µm and less than 3.5 µm. When the thickness of the film is set to the above range, a capacitor having a high capacitance can be obtained.

It is generally well known that as a film which is used as an insulator for capacitors becomes thinner, the capacitance of a capacitor becomes higher advantageously. However, when the thickness of the film is actually reduced, the film is readily wrinkled or broken, thereby reducing its handling properties. Further, the added particles readily fall off with the result that the breakdown voltage lowers. Moreover, when the film becomes thin, such a problem occurs that the absolute value of the breakdown voltage becomes small. Therefore, balancing them becomes essential. In the present invention, a novel film (4) containing an antioxidant and specific particles is obtained by the production method which will be described hereinafter without causing the above problems even when the film is made thin.

(Center Line Average Surface Roughness: Ra)

The center line average surface roughness (Ra) of at least one side of the film (4) of the present invention is preferably 7 to 89 nm. When the center line average surface roughness (Ra) is set to the above range, the effect of improving windability can be made large. Further, anti-blocking is improved and the appearance of a film roll can be made better. When the surface roughness (Ra) is too low, slipperiness tends to become too low, thereby reducing the effect of improving windability. When the center line average surface roughness (Ra) is too high, slipperiness tends to become too high, thereby reducing the effect of improving windability with the result that telescoping readily occurs at the time of winding. From this point of view, the lower limit of the center line average surface roughness (Ra) is preferably 11 nm, more preferably 21 nm, much more preferably 31 nm. The upper limit of the center line average surface roughness (Ra) is preferably 79 nm, more preferably 69 nm, much more preferably 59 nm.

(10-Point Average Roughness: Rz)

The 10-point average roughness (Rz) of at least one side of the film (4) of the present invention is preferably 200 to 3,000 nm. When the 10-point average roughness (Rz) is set to the above range, the effect of improving windability can be made large. When the 10-point average roughness (Rz) is too low and the film is wound up in a roll form, air removability tends to degrade, thereby reducing the effect of improving windability with the result that the film readily slips in the transverse direction. Particularly when the film is thin, as it is not stiff, air removability tends to become lower, thereby further reducing the effect of improving windability. When the 10-point average roughness (Rz) is too high, the number of large projections tends to increase and the effect of improving the breakdown voltage becomes small. From this point of view, the lower limit of the 10-point average roughness (Rz) is preferably 600 nm, more preferably 1,000 nm, particularly preferably 1,250 nm. The upper limit of the 10-point average roughness (Rz) is preferably 2,600 nm, more preferably 2,250 nm, particularly preferably 1,950 nm.

(Method of Manufacturing Film (4))

The film (4) of the present invention can be basically obtained by a conventionally known method or a method which has been accumulated in the industry except for a partial special production method. A detailed description is subsequently given of the method of producing the film (4) of the present invention.

First, a resin composition comprising a styrene-based polymer having a syndiotactic structure and a predetermined amount of an antioxidant is molten by heating to form an unstretched sheet. Stated more specifically, the resin composition is molten by heating at a temperature of its melting point (Tm, unit: ° C.) to (Tm+70° C.), extruded into a sheet form and solidified by cooling to obtain an unstretched sheet.

Thereafter, this unstretched sheet is stretched in biaxial directions. Stretching may be carried out in both the longitudinal direction (mechanical axis direction) and the transverse direction (direction perpendicular to the mechanical axis direction) at the same time or sequentially in any order. For example, in the case of sequential stretching, the film is first stretched to 2.7 to 4.8 times, preferably 2.9 to 4.4 times, more preferably 3.1 to 4.0 times at a temperature of (glass transition point temperature of the resin composition (Tg, unit: ° C.)–10° C.) to (Tg+70° C.) in a monoaxial direction. The film is then stretched to 2.8 to 4.9 times, preferably 3.0 to 4.5 times, more preferably 3.2 to 4.1 times at a temperature of Tg to (Tg+80° C.) in a direction perpendicular to the monoaxial direction.

Stretching in the direction perpendicular to the above monoaxial direction becomes difficult probably due to crystallization which proceeds by stretching in the previous stage, whereby film breakage readily occurs during film formation. Particularly when a film as thin as about 3 μm is to be produced and the draw ratio exceeds 3.2 times, breakage readily occurs.

When a countermeasure against it was studied, it was found that it is effective to set the stretching rate for stretching in the direction perpendicular to the above monoaxial direction to a predetermined range. That is, when the stretching rate is too fast, the high-order structural change of the molecule by stretching cannot follow the speed of change in the shape of the film by stretching, whereby the high-order structure is apt to be distorted and therefore film breakage readily occurs. When the stretching rate is too slow, the crystallization of the film precedes during stretching and stretching nonuniformity and thickness nonuniformity tend to be produced probably due to variations in stretching stress, whereby breakage readily occurs. From this point of view, the lower limit of the stretching rate is preferably 500%/min, more preferably 1,000%/min, much more preferably 2,000%/min, particularly preferably 4,000%/min. The upper limit of the stretching rate is preferably 30,000%/min, more preferably 15,000%/min, much more preferably 9,000%/min, particularly preferably 6,000%/min.

It was further found that it is also effective as alternative means to divide the stretching temperature for stretching in the direction perpendicular to the monoaxial direction into a plurality of stages without fixing it and make a temperature difference between the temperature of the first stage and the temperature of the last stage. As for the lower limit of the temperature difference, the temperature of the last stage is preferably 4° C. or more, more preferably 7° C. or more, much more preferably 12° C. or more, particularly preferably 15° C. or more higher than the temperature of the first stage. The upper limit of the temperature difference is preferably 49° C., more preferably 39° C., much more preferably 29° C., particularly preferably 20° C. When the temperature difference is too large, film breakage readily occurs. The thickness nonuniformity of the film after stretching tends to become large. When the temperature difference between the first stage and the last stage is set to the above range, a high draw ratio which has been difficult to be achieved in the formation of a thin film can be achieved, thereby making it possible to obtain a film having little nonuniformity in thickness.

To make a temperature difference between the first stage and the last stage in the step of carrying out stretching in the direction perpendicular to the monoaxial direction, a temperature difference may be made between the inlet (first stage) and outlet (last stage) of one stretching zone or between the first stretching zone (first stage) and the last stretching zone (last stage) by providing two or more continuous stretching zones having different temperatures. The "zone" refers to one area partitioned by a shutter or the like in a tenter or the like. In either case, it is preferred that the section between the first stage and the last stage should be further divided so that the temperature is increased from the first stage toward the last stage obliquely, particularly linearly. For example, when there are two or more continuous stretching zones having different temperatures, preferably one or more, more preferably 1 to 10 stretching zones are provided between the first stretching zone and the last stretching zone. It is disadvantageous from the viewpoint of equipment cost that the total number of stretching zones is 13 or more. When the film is to be stretched in the transverse direction, the value obtained by dividing the width of the film right after it comes out from the last stage by the width of the film right before it enters the first stage should become the target draw ratio, and the width of the film is preferably increased obliquely, particularly linearly. Even when the film is to be stretched in the longitudinal direction and the transverse direction at the same time, the stretching temperature is divided into a plurality of stages and a temperature difference is made between the temperature of the first stage and the temperature of the last stage likewise.

In the present invention, these means are preferred as means of achieving the preferred refractive index in the thickness direction of the present invention. Further, since breakage hardly occurs even when the film is made thin according to these means, these means are preferred as means of achieving the preferred film thickness in the present invention. In the present invention, at least one of the above stretching rate and the stretching temperature is preferably adopted but it is more preferred that both of them should be adopted so that the stretching step is stabilized and the preferred refractive index and the preferred film thickness in the present invention are easily achieved.

Thereafter, the film (4) is heat set at a temperature of (Tg+70° C.) to Tm. The heat setting temperature is 200 to 260° C., preferably 220 to 250° C., more preferably 230 to 240° C. When the heat setting temperature is too high and a thin film is to be produced, film breakage readily occurs and thickness nonuniformity becomes large. When relaxation is carried out at a temperature 20 to 90° C. lower than the heat setting temperature as required after heat setting, dimensional stability is improved.

EXAMPLES

The following examples and comparative examples are provided to further illustrate the present invention.

Examples 1 to 7 and Comparative Examples 1 to 3

The characteristic property values of Examples 1 to 7 and Comparative Examples 1 to 3 were measured and evaluated by the following methods.

(1) average particle diameter and particle diameter ratio of particles
(1-1) average particle diameter and particle diameter ratio of powders Powders were scattered over a sample table such that their particles were not overlapped with one another as much as possible and a gold thin film deposition layer was formed on this surface to a thickness of 200 to 300 Å by a gold sputtering device and observed through a scanning electron microscope at a magnification of 10,000 to 30,000× to obtain the area equivalent particle diameters (Di), long diameters (Dli) and short diameters (Dsi) of at least 100 particles by the Luzex 500 of NIRECO CORPORATION.

(1-2) average particle diameter and particle diameter ratio of particles contained in film A sample film piece was fixed on the sample table of a scanning electron microscope and the surface of the film was ion etched at 0.25 kV and 1.25 mA in a vacuum of 0.13 Pa by using the sputtering device (JIS-1100 ion sputtering device) of JEOL Ltd. for 10 minutes. Further, gold sputtering was carried out with the same device and the surface was observed through a scanning electron microscope at a magnification of 10,000 to 30,000× to obtain the area equivalent particle diameters (Di), long diameters (Dli) and short diameters (Dsi) of at least 100 particles by the Luzex 500 of NIRECO CORPORATION.

The average particle diameter and particle diameter ratio of the powders and the average particle diameter and particle diameter ratio of the particles contained in the film were calculated from values obtained from the above item (1-1) and the above item (1-2) based on the following equation, respectively, in which the number of particles is represented by "n" and the number average value of the area equivalent diameters (Di) is taken as the average particle diameter (D).

$$D = \left(\sum_{i=1}^{n} Di\right) / n$$

The particle diameter ratio was calculated from the average value (Dl)) of the long diameters and the average value (Ds) of the short diameters obtained from the following equations as Dl/Ds.

$$Dl = \left(\sum_{i=1}^{n} Dli\right) / n$$

$$Ds = \left(\sum_{i=1}^{n} Dsi\right) / n$$

(2) relative standard deviation of particle diameter of particles

The relative standard deviation of powders and the relative standard deviation of particles contained in the film were obtained from the area equivalent particle diameters (Di) and the average particle diameters (D) of particles obtained from the above item (1-1) and the above item (1-2) based on the following equation, respectively.

$$\text{Relative standard deviation} = \frac{\sqrt{\sum_{i=1}^{n} (Di - D)^2 / n}}{D}$$

(3) surface roughness of film
(3-1) center line average surface roughness (Ra)

The projection profile of the surface of the film was measured with an optical probe having a beam diameter of 1.6 μm of a semiconductor laser having a wavelength of 780 nm by using a non-contact 3-D roughness meter (ET-30HK of Kosaka Laboratory Ltd.) under the following conditions: measurement length (Lx) of 1 mm, sampling pitch of 2 μm, cut-off of 0.25 mm, magnification in the thickness direction of 10,000×, magnification in the transverse direction of 200× and 100 scanning lines (therefore, measurement length Ly in Y direction of 0.2 mm). When the roughness curve is represented by Z=f (x, y), the value obtained from the following equation is defined as the center line average surface roughness (Ra, unit: nm) of the film.

$$Ra = 1/(LxLy) \int_0^{Lx} \int_0^{Ly} |f(x, y)| dx dy$$

(3-2) 10-point average roughness (Rz)

The average roughness was obtained as Rz (unit: nm) from the following equation by taking five highest peaks (Hp) and five lowest valleys (Hv).

$$Rz = \frac{(Hp1 + Hp2 + Hp3 + Hp4 + Hp5) - (Hv1 + Hv2 + Hv3 + Hv4 + Hv5)}{5}$$

(4) heat shrinkage factor

The shrinkage factor (unit: %) of the film after it was left in a 150° C. atmosphere under no tension for 30 minutes was obtained.

(5) refractive index

The refractive index in the thickness direction was measured at 23° C. and 65% RH with an Abbe refractometer using a sodium D line (589 nm) as a light source and taken as nZ.

(6) breakdown voltage (BDV)

This was measured by the method specified in JIS C 2151. The voltage was raised at a rate of 100 V/sec in a 23° C. and 50% RH atmosphere by using a DC withstand voltage tester and a 25 mm-diameter brass column as an upper electrode and a 75 mm-diameter aluminum column as a lower electrode to read a voltage at which the film was broken and short-circuited. The measurement was repeated 41 times, and 21 center values excluding 10 largest values and 10 smallest values were used as measurement values of the breakdown voltage (BDV).

The electrodes and the sample were set in a hot air oven, the oven was connected to a power supply by a heat-resistant cord, and the increase of the voltage was started 1 minute after the sample was put into the oven to carry out the above measurement at 100° C. and 120° C.

(7) stretchability

Stretchability was judged based on the number of times of the breakage of a biaxially oriented film while 1,000,000 m of the film was formed.

Stretchability ⊚: less than one time of breakage per 100,000 m of the film

Stretchability ○: 1 or more and less than 2 times of breakage per 100,000 m of the film Stretchability Δ: 2 or more and less than 4 times of breakage per 100,000 m of the film Stretchability X: 4 or more and less than 8 times of breakage per 100,000 m of the film Stretchability XX: 8 times or more of breakage per 100,000 m of the film (8) windability of film 6,000 m of the film having a width of 550 mm is wound up in a roll format a rate of 100 m/min in the film production process to evaluate it according to its wound state and the appearance of the roll as follows.

A: roll having a good wound form

B: almost satisfactory though one or more and less than 5 pimples (projections) are seen on the surface of the roll C: 5 or more pimples (projections) are seen on the surface of the roll and the roll has a bad appearance D: telescoping occurs and the roll has a bad wound form

[Preparation of Silicone Resin Particles Surface Treated with Silane Coupling Agent]

7,000 g of an aqueous solution containing 0.06 mass % of sodium hydroxide was filled into a 10-liter glass vessel having a stirring blade, 1,000 g of methyltrimethoxysilane containing 0.01 mass % of polyoxyethylene lauryl ether was gently poured into the upper layer of the solution to form two layers, and the vessel was slightly turned at 10 to 15° C. to carry out an interfacial reaction for 2 hours so as to produce spherical particles. Thereafter, aging was carried out by setting the inside temperature of the system to 70° C. for about 1 hour, the vessel was cooled, and then the resulting reaction product was filtered with a vacuum filtration apparatus to obtain a caked product of silicone resin particles having a water content of about 40%. Then, 4,000 g of an aqueous solution containing 2 mass % of γ-glycidoxypropyltrimethoxysilane dispersed therein as a silane coupling agent was filled into another glass vessel, and the caked product obtained by the above reaction was wholly added to the solution to obtain slurry which was then surface treated at an inside temperature of 70° C. under agitation for 3 hours, cooled and filtered with a vacuum filtration apparatus to obtain a caked product. Then, this caked product was wholly added to 600 g of pure water to prepare slurry again which was stirred at normal temperature for 1 hour and then filtered with a vacuum filtration apparatus again to obtain a caked product having a water content of about 40% from which an excess emulsifier and an excess silane coupling agent had been removed. Finally, this caked product was treated at 100° C. under a reduced pressure of 15 torr for 10 hours to obtain about 400 g of powders of silicone resin particles which were surface treated with the silane coupling agent and contained few agglomerated particles.

The obtained powders of silicone resin particles had an average particle diameter of 1.3 μm, a relative standard deviation of 0.14 and a particle diameter ratio of 1.1.

Example 1

0.3 mass % of silicone resin particles having an average particle diameter of 1.3 μm, a relative standard deviation of 0.14 and a particle diameter ratio of 1.1 as the spherical crosslinked polymer particles A1 and 0.2 mass % of spherical silica particles having an average particle diameter of 0.3 μm, a relative standard deviation of 0.17 and a particle diameter ratio of 1.1 (Seahoster KE "tradename" of Nippon Shokubai Co., Ltd.) as the inert fine particles B1 were added to polystyrene which had a weight average molecular weight of $3.0 \times 10^5$ and whose structure was observed as almost perfectly syndiotactic in the $^{13}$C-NMR measurement to obtain a styrene-based polymer. The silicone resin particles surface treated with a silane coupling agent obtained above were used as the spherical crosslinked polymer particles A1.

This polymer was dried at 120° C. for 4 hours, supplied into an extruder to be molten at 290° C., extruded from a die slit and solidified by cooling on a casting drum so as to produce an unstretched sheet.

This unstretched sheet was stretched to 2.9 times in the longitudinal direction (mechanical axis direction) at 114° C. and then guided to a tenter to be stretched to 3.0 times in the transverse direction (direction perpendicular to the mechanical axis direction). At this point, as for stretching in the transverse direction, the film was stretched to 2.0 times at 100° C. in the first stretching zone (first stage) and to 1.5 times at 111° C. in the second stretching zone (last stage) in the stretching step having two stretching zones with the same length in order to increase the width of the film linearly so that the final draw ratio became 3.0 times. Thereafter, the film was heat set at 235° C. for 9 seconds and relaxed 5% while it was cooled to 180° C. to obtain a biaxially oriented film having a thickness of 3.0 μm which was then wound up in a roll form. The characteristic properties of the obtained film are shown in Table 1.

The film obtained in Example 1 had excellent stretchability and windability and a high breakdown voltage and was preferred as an insulator for capacitors.

Examples 2 to 7 and Comparative Example 1

Biaxially oriented films were obtained in the same manner as in Example 1 except that the spherical crosslinked polymer particles A1, the inert fine particles B1, the film forming conditions and the film thickness were changed as shown in Table 1. The characteristic properties of the obtained films are shown in Table 1.

The films obtained in Examples 2 and 3 had excellent stretchability and windability and a high breakdown voltage and were preferred as an insulator for capacitors.

The films obtained in Examples 4 to 6 had excellent windability and a high breakdown voltage and were preferred as an insulator for capacitors. They had a practical level of stretchability.

Although the film obtained in Example 7 was inferior in stretchability, it had a high breakdown voltage and was preferred as an insulator for capacitors.

Since the film obtained in Comparative Example 1 had a low refractive index in the thickness direction, it had a low breakdown voltage and was not suitable for use as an insulator for capacitors.

Comparative Example 2

When film forming conditions such as draw ratios in the longitudinal direction and the transverse direction were set as shown in Table 1 to obtain a film having a refractive index in the thickness direction of about 1.6600, film breakage occurred frequently and a biaxially oriented film could not be obtained.

Comparative Example 3

Polypropylene having an isotacticity of 97% obtained from $^{13}$C-NMR was molten at 250° C., extruded from a die slit and solidified by cooling on a 80° C. roll to obtain an unstretched sheet. This unstretched sheet was stretched to 4.5 times in the longitudinal direction at 135° C. and to 9 times in the transverse direction at 163° C., heat set at 163° C. for 9 seconds and relaxed 2% at 160° C. to obtain a biaxially oriented polypropylene film having a thickness of 3.0 μm.

The film obtained in Comparative Example 3 had low heat resistance and its breakdown voltage greatly dropped at a high temperature. It had a high heat shrinkage factor and was not suitable for use as a highly insulating film.

TABLE 1

| | | | Unit | Example 1 | Example 2 | Example 3 | Example 4 | Example 5 |
|---|---|---|---|---|---|---|---|---|
| Spherical crosslinked polymer particles A1 | Type | | — | Silicone resin particles | Silicone resin particles | Silicone resin particles | Silicone resin particles | Silicone resin particles |
| | In film | Average particle diameter | μm | 1.3 | 1.3 | 1.3 | 1.3 | 1.3 |
| | | Relative standard deviation of particle diameter | — | 0.14 | 0.14 | 0.14 | 0.14 | 0.14 |
| | | Particle diameter ratio | — | 1.1 | 1.1 | 1.1 | 1.1 | 1.1 |
| | Content | | mass % | 0.3 | 0.3 | 0.3 | 0.3 | 0.3 |
| Inert fine particles B1 | Type | | — | Spherical silica particles | Spherical silica particles | Spherical silica particles | Spherical silica particles | Spherical silica particles |
| | In film | Average particle diameter | μm | 0.3 | 0.3 | 0.3 | 0.3 | 0.3 |
| | | Relative standard deviation of particle diameter | — | 0.17 | 0.17 | 0.17 | 0.17 | 0.17 |
| | | Particle diameter ratio | — | 1.1 | 1.1 | 1.1 | 1.1 | 1.1 |
| | Content | | mass % | 0.2 | 0.2 | 0.2 | 0.2 | 0.2 |
| Film forming conditions | Draw ratio in longitudinal direction | | times | 2.9 | 3.3 | 3.6 | 3.6 | 3.8 |
| | Longitudinal stretching temperature | | ° C. | 114 | 115 | 116 | 116 | 118 |
| | Draw ratio in transverse direction | | times | 3.0 | 3.6 | 3.9 | 3.9 | 4.0 |
| | Transverse stretching temperature | First stage | ° C. | 100 | 101 | 105 | 122 | 115 |
| | | Last stage | ° C. | 111 | 122 | 126 | 126 | 128 |
| | Heat setting temperature | | ° C. | 235 | 235 | 240 | 240 | 235 |
| | Relaxation rate | | % | 5 | 5 | 4 | 4 | 5 |
| | Relaxation temperature | | ° C. | ~180 | ~180 | ~180 | ~180 | ~180 |
| Film characteristic properties | Stretchability | | — | ◎ | ◎ | ○ | Δ | Δ |
| | Windability | | — | A | A | A | B | B |
| | Film thickness | | μm | 3.0 | 3.0 | 3.0 | 3.0 | 3.0 |
| | Center line average surface roughness (Ra) | | nm | 57 | 55 | 52 | 53 | 50 |
| | 10-point average roughness (Rz) | | nm | 1310 | 1330 | 1350 | 1340 | 1360 |
| | Refractive index in thickness direction (nZ) | | — | 1.6106 | 1.6218 | 1.6223 | 1.6225 | 1.6350 |
| | Heat shrinkage factor | Longitudinal direction | % | 3.1 | 3.3 | 3.4 | 3.4 | 3.6 |
| | | Transverse direction | % | 1.5 | 1.6 | 1.7 | 1.7 | 1.9 |
| | Breakdown voltage | 23° C. | V/μm | 340 | 360 | 380 | 380 | 390 |
| | | 100° C. | V/μm | 330 | 350 | 370 | 370 | 380 |
| | | 120° C. | V/μm | 320 | 340 | 360 | 360 | 370 |

| | | | Unit | Example 6 | Example 7 | Comparative Example 1 | Comparative Example 2 | Comparative Example 3 |
|---|---|---|---|---|---|---|---|---|
| Spherical crosslinked polymer particles A1 | Type | | — | Silicone resin particles | Silicone resin particles | Silicone resin particles | Silicone resin particles | Nil |
| | In film | Average particle diameter | μm | 1.3 | 1.3 | 1.3 | 1.3 | |
| | | Relative standard deviation of particle | — | 0.14 | 0.14 | 0.14 | 0.14 | |

| | | Unit | | | | | |
|---|---|---|---|---|---|---|---|
| Inert fine particles B1 | diameter Particle diameter ratio | — | — | 1.1 | 1.1 | 1.1 | 1.1 | |
| | Content | mass % | 0.3 | 0.3 | 0.3 | 0.3 | Nil |
| | Type | — | Spherical silica particles | Spherical silica particles | Spherical silica particles | Spherical silica particles | |
| | In film Average particle diameter | μm | 0.3 | 0.3 | 0.3 | 0.3 | |
| | Relative standard deviation of particle diameter | — | 0.17 | 0.17 | 0.17 | 0.17 | |
| | Particle diameter ratio | — | 1.1 | 1.1 | 1.1 | 1.1 | |
| | Content | mass % | 0.2 | 0.2 | 0.2 | 0.2 | |

| | | Unit | Example 6 | Example 7 | C. Ex. 1 | C. Ex. 2 | C. Ex. 3 |
|---|---|---|---|---|---|---|---|
| Film forming conditions | Draw ratio in longitudinal direction | times | 4.1 | 4.5 | 2.6 | 5.0 | 4.5 |
| | Longitudinal stretching temperature | °C. | 120 | 120 | 112 | 120 | 135 |
| | Draw ratio in transverse direction | time | 4.2 | 4.6 | 2.7 | 5.2 | 9.0 |
| | Transverse stretching temperature First stage | °C. | 118 | 118 | 100 | 118 | 163 |
| | Last stage | °C. | 129 | 129 | 112 | 129 | 163 |
| | Heat setting temperature | °C. | 235 | 235 | 235 | 235 | 163 |
| | Relaxation rate | % | 5 | 5 | 5 | 5 | 2 |
| | Relaxation temperature | °C. | ~180 | ~180 | ~180 | ~180 | 160 |
| Film characteristic properties | Stretchability | — | Δ | X | ⊚ | XX | ○ |
| | Windability | — | B | B | C | — | C |
| | Film thickness | μm | 3.0 | 3.0 | 3.0 | — | 3.0 |
| | Center line average surface roughness (Ra) | nm | 50 | 46 | 50 | — | 39 |
| | 10-point average roughness (Rz) | nm | 1370 | 1380 | 1240 | — | 750 |
| | Refractive index in thickness direction (nZ) | — | 1.6400 | 1.6500 | 1.6003 | — | 1.5160 |
| | Heat shrinkage factor Longitudinal direction | % | 3.9 | 4.0 | 2.4 | — | 9.8 |
| | Transverse direction | % | 2.2 | 2.3 | 0.3 | — | 8.2 |
| | Breakdown voltage 23° C. | V/μm | 390 | 390 | 260 | — | 400 |
| | 100° C. | V/μm | 380 | 380 | 230 | — | 270 |
| | 120° C. | V/μm | 370 | 370 | 220 | — | 160 |

C. Ex.: Comparative Example

A capacitor was produced as follows by using each of the obtained films.

Aluminum was first vacuum deposited on one side of the film to a thickness of 500 Å. At this point, aluminum was deposited in vertical stripes which consisted of 8 mm-wide deposited portions and 1 mm-wide non-deposited portions. The obtained deposited film was slit at the center portions in the width directions of the deposited portions and the non-deposited portions, and the obtained 4.5 mm-wide tapes, each consisting of a 4 mm-wide deposited portion and a 0.5 mm-wide non-deposited portion, were wound up to obtain reels. Then, two reels were joined together in such a manner that their non-deposited portions were located at the respective opposite ends and wound up to obtain a roll which was pressed at 150° C. and 1 MPa for 5 minutes. Metallikon was thermally sprayed over the both end faces of the pressed roll to form external electrodes and a lead wire was welded to the Metallikon to produce a rolled film capacitor.

The film capacitors obtained from Examples 1 to 7 had excellent heat resistance and withstand voltage characteristics and showed excellent performance as a capacitor.

Examples 8 to 16 and Comparative Examples 4 to 6

The characteristic property values of Examples 8 to 16 and Comparative Examples 4 to 6 were measured and evaluated by the following methods.
(1) average particle diameter and particle diameter ratio of particles
(1-1) average particle diameter and particle diameter ratio of powders Powders were scattered over a sample table such that their particles were not overlapped with one another as much as possible and a gold thin film deposition layer was formed on this surface to a thickness of 200 to 300 Å by a gold sputtering device and observed through a scanning electron microscope at a magnification of 10,000 to 30,000× to obtain the area equivalent particle diameters (Di), long diameters (Dli) and short diameters (Dsi) of at least 1,000 particles by the Luzex 500 of NIRECO CORPORATION.
(1-2) average particle diameter and particle diameter ratio of particles contained in film A sample film piece was fixed on the sample table of a scanning electron microscope and the surface of the film was ion etched at 0.25 kV and 1.25 mA in a vacuum of 0.13 Pa by using the sputtering device (JIS-1100 ion sputtering device) of JEOL Ltd. for 10 minutes. Further, gold sputtering was carried out with the same device and the surface was observed through a scanning electron microscope at a magnification of 10,000 to 30,000× to obtain the area equivalent particle diameters (Di), long diameters (Dli) and short diameters (Dsi) of at least 1,000 particles by the Luzex 500 of NIRECO CORPORATION.

The average particle diameter and particle diameter ratio of the powders and the average particle diameter and particle diameter ratio of the particles contained in the film were calculated from values obtained from the above item (1-1) and the above item (1-2) based on the following equation, respectively, in which the number of particles is represented by "n" and the number average value of the area equivalent diameters (Di) is taken as the average particle diameter (D).

$$D = \left(\sum_{i=1}^{n} Di\right)/n$$

The particle diameter ratio was calculated from the average value (Dl) of the long diameters and the average value (Ds) of the short diameters obtained from the following equations as Dl/Ds.

$$Dl = \left(\sum_{i=1}^{n} Dli\right)/n$$

$$Ds = \left(\sum_{i=1}^{n} Dsi\right)/n$$

(2) relative standard deviation of particle diameter of particles

The relative standard deviation of powders and the relative standard deviation of particles contained in the film were obtained from the area equivalent particle diameters (Di) and the average particle diameters (D) of particles obtained from the above item (1-1) and the above item (1-2) based on the following equation, respectively.

$$\text{Relative standard deviation} = \frac{\sqrt{\sum_{i=1}^{n}(Di-D)^2/n}}{D}$$

The center line average surface roughness (Ra) (3-1), 10-point average roughness (Rz) (3-2), heat shrinkage factor (4), refractive index (5), breakdown voltage (BDV) (6), stretchability (7) and film windability (8) were measured and evaluated in the same manners as in Examples 1 to 7.

Example 8

0.3 mass % of spherical silica particles having an average particle diameter of 1.1 μm, a relative standard deviation of 0.15 and a particle diameter ratio of 1.08 (Seahoster (registered trademark) KE-P100 of Nippon Shokubai Co., Ltd.) as the silica particles A2 and 0.2 mass % of spherical silica particles having an average particle diameter of 0.3 μm, a relative standard deviation of 0.16 and a particle diameter ratio of 1.08 (Seahoster (registered trademark) KE-P30 of Nippon Shokubai Co., Ltd.) as the inert fine particles B2 were added to polystyrene which had a weight average molecular weight of $3.0 \times 10^5$ and whose structure was observed as almost perfectly syndiotactic in the $^{13}$C-NMR measurement to obtain a styrene-based polymer.

This polymer was dried at 120° C. for 4 hours, supplied into an extruder to be molten at 290° C., extruded from a die slit and solidified by cooling on a casting drum so as to produce an unstretched sheet.

This unstretched sheet was stretched to 3.0 times in the longitudinal direction (mechanical axis direction) at 114° C. and then guided to a tenter to be stretched to 3.1 times in the transverse direction (direction perpendicular to the mechanical axis direction). At this point, as for stretching in the transverse direction, the film was stretched to 2.05 times at 100° C. in the first stretching zone (first stage) and to 1.51 times at 112° C. in the second stretching zone (last stage) in the stretching step having two stretching zones with the same length to increase the width of the film linearly so that the final draw ratio became 3.1 times. Thereafter, the film was heat set at 235° C. for 9 seconds and relaxed 5% in the transverse direction while it was cooled to 180° C. to obtain a biaxially oriented film having a thickness of 3.0 μm which was then was wound up in a roll form. The characteristic properties of the obtained film are shown in Table 2.

The film obtained in Example 8 had excellent stretchability and windability and a high breakdown voltage and was preferred as an insulator for capacitors.

Examples 9 to 14

Biaxially oriented films were obtained in the same manner as in Example 8 except that the silica particles A2, the inert fine particles B2, the film forming conditions and film thickness were changed as shown in Table 2. The characteristic properties of the obtained films are shown in Table 2.

Example 15

A biaxially oriented film was obtained in the same manner as in Example 8 except that spherical silica particles having an average particle diameter of 0.8 μm, a relative standard deviation of 0.15 and a particle diameter ratio of 1.08 were used as the silica particles A2, spherical silica particles having an average particle diameter of 0.4 μm, a relative standard deviation of 0.15 and a particle diameter ratio of 1.08 were used as the inert fine particles B2, and the contents of the silica particles A2 and the inert fine particles B2, the film forming conditions and the film thickness were set as shown in Table 2. The characteristic properties of the obtained film are shown in Table 2.

Example 16

A biaxially oriented film was obtained in the same manner as in Example 8 except that spherical silica particles having an average particle diameter of 1.6 μm, a relative standard deviation of 0.13 and a particle diameter ratio of 1.10 (Seahoster (registered trademark) KE-P150 of Nippon Shokubai Co., Ltd.) were used as the silica particles A2, spherical silica particles having an average particle diameter of 0.1 μm, a relative standard deviation of 0.17 and a particle diameter ratio of 1.07 (Seahoster (registered trademark) KE-P10 of Nippon Shokubai Co., Ltd.) were used as the inert fine particles B2, and the contents of the silica particles A2 and the inert fine particles B2, the film forming conditions and the film thickness were set as shown in Table 2. The characteristic properties of the obtained film are shown in Table 2.

The films obtained in Examples 9 and 10 had excellent stretchability and windability and a high breakdown voltage and therefore were preferred as an insulator for capacitors.

The films obtained in Examples 11 to 13 had excellent windability and a high breakdown voltage and therefore were preferred as an insulator for capacitors. The films had a practical level of stretchability.

Although the film obtained in Example 14 was inferior in stretchability, it had a high breakdown voltage and was preferred as an insulator for capacitors.

The films obtained in Examples 15 and 16 had excellent stretchability and windability and a high breakdown voltage and therefore were preferred as an insulator for capacitors.

Comparative Example 4

A biaxially oriented film was obtained in the same manner as in Example 8 except that the silica particles A2, the inert fine particles B2, the film forming conditions and the film thickness were changed as shown in Table 2. The characteristic properties of the obtained film are shown in Table 2. The film obtained in Comparative Example 4 had a low breakdown voltage due to its low refractive index in the thickness direction and was therefore not suitable for use as an insulator for capacitors.

Comparative Example 5

When film forming conditions such as draw ratios in the longitudinal direction and the transverse direction were changed as shown in Table 2 to obtain a film having a refractive index in the thickness direction of about 1.6600, film breakage occurred frequently and a biaxially oriented film could not be obtained.

Comparative Example 6

Polypropylene having an isotacticity of 97% obtained from $^{13}$C-NMR was molten at 250° C., extruded from a die slit and solidified by cooling on a 80° C. roll to produce an unstretched sheet. Thereafter, the unstretched sheet was stretched to 4.5 times in the longitudinal direction at 135° C. and to 9 times in the transverse direction at 163° C., heat set at 163° C. for 9 seconds and relaxed 2% at 160° C. to obtain a biaxially oriented polypropylene film having a thickness of 3.0 μm. The characteristic properties of the obtained film are shown in Table 2.

The film obtained in Comparative Example 6 had low heat resistance and its breakdown voltage greatly dropped at a high temperature. It had a high heat shrinkage factor and was therefore not suitable for use as a highly insulating film.

TABLE 2

| | | | Unit | Example 8 | Example 9 | Example 10 | Example 11 | Example 12 |
|---|---|---|---|---|---|---|---|---|
| Silica particles A2 | Type | | — | Spherical silica particles | Spherical silica particles | Spherical silica particles | Spherical silica particles | Spherical silica particles |
| | In film | Average particle diameter | μm | 1.1 | 1.1 | 1.1 | 1.1 | 1.1 |
| | | Relative standard deviation of particle diameter | — | 0.15 | 0.15 | 0.15 | 0.15 | 0.15 |
| | | Particle diameter ratio | — | 1.08 | 1.08 | 1.08 | 1.08 | 1.08 |
| | Content | | mass % | 0.3 | 0.3 | 0.3 | 0.3 | 0.3 |
| Inert fine particles B2 | Type | | — | Spherical silica particles | Spherical silica particles | Spherical silica particles | Spherical silica particles | Spherical silica particles |
| | In film | Average particle diameter | μm | 0.3 | 0.3 | 0.3 | 0.3 | 0.3 |
| | | Relative standard deviation of particle diameter | — | 0.16 | 0.16 | 0.16 | 0.16 | 0.16 |
| | | Particle diameter ratio | — | 1.08 | 1.08 | 1.08 | 1.08 | 1.08 |
| | Content | | mass % | 0.2 | 0.2 | 0.2 | 0.2 | 0.2 |
| Film forming conditions | Draw ratio in longitudinal direction | | times | 3.0 | 3.3 | 3.6 | 3.6 | 3.8 |
| | Longitudinal stretching temperature | | ° C. | 114 | 115 | 116 | 116 | 118 |
| | Draw ratio in transverse direction | | times | 3.1 | 3.5 | 3.8 | 3.8 | 3.9 |
| | Transverse stretching temperature | First stage | ° C. | 100 | 101 | 105 | 120 | 115 |
| | | Last stage | ° C. | 112 | 121 | 125 | 125 | 127 |
| | Heat setting temperature | | ° C. | 235 | 235 | 240 | 240 | 235 |
| | Relaxation rate | | % | 5 | 5 | 4 | 4 | 5 |
| | Relaxation temperature | | ° C. | ~180 | ~180 | ~180 | ~180 | ~180 |
| Film characteristic properties | Stretchability | | — | ◎ | ◎ | ○ | Δ | Δ |
| | Windability | | — | A | A | A | B | B |
| | Film thickness | | μm | 3.0 | 3.0 | 3.0 | 3.0 | 3.0 |

TABLE 2-continued

|  |  | Unit |  |  |  |  |  |
|---|---|---|---|---|---|---|---|
| Center line average surface roughness (Ra) |  | nm | 55 | 54 | 51 | 52 | 49 |
| 10-point average roughness (Rz) |  | nm | 1270 | 1280 | 1300 | 1290 | 1310 |
| Refractive index in thickness direction (nZ) |  | — | 1.6108 | 1.6216 | 1.6222 | 1.6223 | 1.6348 |
| Heat shrinkage factor | Longitudinal direction | % | 3.2 | 3.3 | 3.4 | 3.4 | 3.6 |
|  | Transverse direction | % | 1.5 | 1.5 | 1.6 | 1.6 | 1.8 |
| Breakdown voltage | 23° C. | V/μm | 320 | 340 | 350 | 350 | 360 |
|  | 100° C. | V/μm | 310 | 330 | 340 | 340 | 350 |
|  | 120° C. | V/μm | 300 | 320 | 330 | 330 | 340 |

|  |  |  | Unit | Example 13 | Example 14 | Example 15 | Example 16 |
|---|---|---|---|---|---|---|---|
| Silica particles A2 | Type |  | — | Spherical silica particles | Spherical silica particles | Spherical silica particles | Spherical silica particles |
|  | In film | Average particle diameter | μm | 1.1 | 1.1 | 0.8 | 1.6 |
|  |  | Relative standard deviation of particle diameter | — | 0.15 | 0.15 | 0.15 | 0.13 |
|  |  | Particle diameter ratio | — | 1.08 | 1.08 | 1.08 | 1.10 |
|  | Content |  | mass % | 0.3 | 0.3 | 0.5 | 0.1 |
| Inert fine particles B2 | Type |  | — | Spherical silica particles | Spherical silica particles | Spherical silica particles | Spherical silica particles |
|  | In film | Average particle diameter | μm | 0.3 | 0.3 | 0.4 | 0.1 |
|  |  | Relative standard deviation of particle diameter | — | 0.16 | 0.16 | 0.15 | 0.17 |
|  |  | Particle diameter ratio | — | 1.08 | 1.08 | 1.08 | 1.07 |
|  | Content |  | mass % | 0.2 | 0.2 | 0.1 | 0.5 |
| Film forming conditions | Draw ratio in longitudinal direction |  | times | 4.0 | 4.4 | 3.3 | 3.3 |
|  | Longitudinal stretching temperature |  | ° C. | 119 | 120 | 115 | 115 |
|  | Draw ratio in transverse direction |  | times | 4.2 | 4.5 | 3.5 | 3.5 |
|  | Transverse stretching temperature | First stage | ° C. | 116 | 117 | 101 | 101 |
|  |  | Last stage | ° C. | 128 | 128 | 121 | 121 |
|  | Heat setting temperature |  | ° C. | 235 | 235 | 235 | 235 |
|  | Relaxation rate |  | % | 5 | 5 | 5 | 5 |
|  | Relaxation temperature |  | ° C. | ~180 | ~180 | ~180 | ~180 |
| Film characteristic properties | Stretchability |  | — | Δ | X | ◎ | ◎ |
|  | Windability |  | — | B | B | B | B |
|  | Film thickness |  | μm | 3.0 | 3.0 | 3.0 | 3.0 |
|  | Center line average surface roughness (Ra) |  | nm | 49 | 45 | 62 | 36 |
|  | 10-point average roughness (Rz) |  | nm | 1320 | 1320 | 960 | 1560 |
|  | Refractive index in thickness direction (nZ) |  | — | 1.6396 | 1.6494 | 1.6216 | 1.6216 |
|  | Heat shrinkage factor | Longitudinal direction | % | 3.9 | 4.0 | 3.3 | 3.3 |
|  |  | Transverse direction | % | 2.2 | 2.3 | 1.5 | 1.5 |
|  | Breakdown voltage | 23° C. | V/μm | 360 | 360 | 340 | 340 |
|  |  | 100° C. | V/μm | 360 | 350 | 330 | 330 |
|  |  | 120° C. | V/μm | 340 | 340 | 320 | 320 |

TABLE 2-continued

| | | Unit | Comparative Example 4 | Comparative Example 5 | Comparative Example 6 |
|---|---|---|---|---|---|
| Silica particles A2 | Type | — | Spherical silica particles | Spherical silica particles | Nil |
| | In film Average particle diameter | μm | 1.1 | 1.1 | |
| | Relative standard deviation of particle diameter | — | 0.15 | 0.15 | |
| | Particle diameter ratio | — | 1.08 | 1.08 | |
| | Content | mass % | 0.3 | 0.3 | |
| Inert fine particles B2 | Type | — | Spherical silica particles | Spherical silica particles | Nil |
| | In film Average particle diameter | μm | 0.3 | 0.3 | |
| | Relative standard deviation of particle diameter | — | 0.16 | 0.16 | |
| | Particle diameter ratio | — | 1.08 | 1.08 | |
| | Content | mass % | 0.2 | 0.2 | |
| Film forming conditions | Draw ratio in longitudinal direction | times | 2.6 | 5.0 | 4.5 |
| | Longitudinal stretching temperature | °C. | 112 | 120 | 135 |
| | Draw ratio in transverse direction | times | 2.6 | 5.1 | 9.0 |
| | Transverse stretching temperature First stage | °C. | 99 | 118 | 163 |
| | Last stage | °C. | 111 | 129 | 163 |
| | Heat setting temperature | °C. | 235 | 235 | 163 |
| | Relaxation rate | % | 5 | 5 | 2 |
| | Relaxation temperature | °C. | ~180 | ~180 | ~160 |
| Film characteristic properties | Stretchability | — | ⊚ | XX | ○ |
| | Windability | — | C | — | C |
| | Film thickness | μm | 3.0 | — | 3.0 |
| | Center line average surface roughness (Ra) | nm | 49 | — | 39 |
| | 10-point average roughness (Rz) | nm | 1190 | — | 750 |
| | Refractive index in thickness direction (nZ) | — | 1.6002 | — | 1.5160 |
| | Heat shrinkage factor Longitudinal direction | % | 2.4 | — | 9.8 |
| | Transverse direction | % | 0.3 | — | 8.2 |
| | Breakdown voltage 23° C. | V/μm | 250 | — | 400 |
| | 100° C. | V/μm | 230 | — | 270 |
| | 120° C. | V/μm | 210 | — | 160 |

A capacitor was produced as follows by using each of the obtained films.

Aluminum was first vacuum deposited on one side of the film to a thickness of 500 Å. At this point, aluminum was deposited in vertical stripes which consisted of 8 mm-wide deposited portions and 1 mm-wide non-deposited portions. The obtained deposited film was slit at the center portions in the width directions of the deposited portions and the non-deposited portions, and the obtained 4.5 mm-wide tapes, each consisting of a 4 mm-wide deposited portion and a 0.5 mm-wide non-deposited portion, were wound up to obtain reels. Then, two reels were joined together in such a manner that their non-deposited portions were located at the respective opposite ends and wound up to obtain a roll which was pressed at 150° C. and 1 MPa for 5 minutes. Metallikon was thermally sprayed over the both end faces of the pressed roll to form external electrodes and a lead wire was welded to the Metallikon to produce a rolled film capacitor.

The film capacitors obtained from Examples 8 to 14 had excellent heat resistance and withstand voltage characteristics and showed excellent performance as a capacitor.

Examples 17 to 29 and Comparative Examples 7 and 8

The following characteristic property values of Examples 17 to 29 and Comparative Examples 7 and 8 were measured and evaluated by the same methods as in Examples 8 to 16.

(1-1) average particle diameter and particle diameter ratio of powders (1-2) average particle diameter and particle diameter ratio of particles contained in film
(2) relative standard deviation of particle diameter of particles
(3-1) center line average surface roughness (Ra)
(3-2) 10-point average roughness (Rz)
(4) heat shrinkage factor
(5) refractive index
(6) breakdown voltage (BDV)
(7) dielectric constant
(8) glass transition point temperature (Tg) and melting point (Tm, Tms)
(9) stretchability
(10) windability

[Preparation of Polyethylene Terephthalate Resin]

Dimethyl terephthalate and ethylene glycol as monomers were polymerized by using manganese acetate as a transesterification catalyst, antimony trioxide as a polymerization catalyst and phosphorous acid as a stabilizer in accordance with a commonly used method to obtain a polyethylene terephthalate resin having an intrinsic viscosity of 0.62 (melting point of 258° C., dielectric constant of 3.2).

Example 17

Polystyrene (melting point (Tms) 270° C., dielectric constant of 2.7) which had a weight average molecular weight of $3.0 \times 10^5$ and whose structure was observed as almost perfectly syndiotactic in the $^{13}$C-NMR measurement as the styrene-based polymer was used as the resin composition. 0.3 part by mass (0.3 mass % in the obtained film) of spherical silica particles having an average particle diameter of 1.1 μm, a relative standard deviation of 0.15 and a particle diameter ratio of 1.08 (Seahoster (registered trademark) of Nippon Shokubai Co., Ltd.) as the inert fine particles A3 and 0.2 part by mass (0.2 mass % in the obtained film) of spherical silica particles having an average particle diameter of 0.3 μm, a relative standard deviation of 0.16 and a particle diameter ratio of 1.08 (Seahoster (registered trademark) of Nippon Shokubai Co., Ltd.) as the inert fine particles B3 were added to 99.5 parts by mass of the obtained resin composition to produce a mixture of the resin composition and the fine particles.

The obtained mixture was pelletized, and the pellet was dried at 130° C. for 7 hours, supplied into an extruder to be molten at 290° C., extruded from a die slit and solidified by cooling on a casting drum to obtain an unstretched sheet.

This unstretched sheet was stretched to 3.2 times in the longitudinal direction (mechanical axis direction) at 114° C. and then guided to a tenter to be stretched to 3.3 times in the transverse direction (direction perpendicular to the mechanical axis direction). At this point, the stretching rate in the transverse direction was set to 5,000%/min, and the stretching temperature was set to 102° C. in the first stage and 119° C. in the last stage. Thereafter, the film was heat set at 235° C. for 9 seconds and relaxed 4% in the width direction while it was cooled to 180° C. to obtain a biaxially oriented film having a thickness of 3.0 μm which was then wound up in a roll form. The characteristic properties of the obtained film are shown in Table 3. The film obtained in Example 17 had excellent stretchability and windability.

Example 18

A biaxially oriented film was obtained in the same manner as in Example 17 except that a resin composition consisting of 95 parts by mass of polystyrene which had a weight average molecular weight of $3.0 \times 10^5$ and whose structure was observed as almost perfectly syndiotactic in the $^{13}$C-NMR measurement as the styrene-based polymer and 5 parts by mass of the polyethylene terephthalate resin obtained above as the resin X was used. The biaxially oriented film was then wound up in a roll form. The characteristic properties of the obtained film are shown in Table 3.

The film obtained in Example 18 had excellent stretchability and windability and a high breakdown voltage and therefore was preferred as a highly insulating film. Therefore, it was preferred as an insulator for capacitors.

Examples 19 to 22

Biaxially oriented films were obtained in the same manner as in Example 18 except that a resin composition consisting of the styrene-based polymer and the resin X in a ratio shown in Table 3 was used. The biaxially oriented films were then wound up in a roll form. The characteristic properties of the obtained films are shown in Table 3.

The films obtained in Examples 19 to 21 had excellent stretchability and windability and a high breakdown voltage and therefore were preferred as a highly insulating film. Therefore, they were preferred as an insulator for capacitors and also as an insulator for capacitors used especially in hybrid cars.

Comparative Example 7 and Example 23

Biaxially oriented films were obtained in the same manner as in Example 19 except that film forming conditions such as draw ratios in the longitudinal direction and the transverse direction and stretching temperature were set as shown in Table 3. The biaxially oriented films were then wound up in a roll form. The characteristic properties of the obtained films are show in Table 3.

Since the film obtained in Comparative Example 7 had a low refractive index in the thickness direction, it had a low breakdown voltage and was not suitable for use as a highly insulating film.

The film obtained in Example 23 had excellent stretchability and windability and a high breakdown voltage and therefore was preferred as a highly insulating film. Therefore, it was preferred as an insulator for capacitors and also as an insulator for capacitors used especially in hybrid cars.

Comparative Example 8

When film forming conditions such as draw ratios in the longitudinal direction and the transverse direction were set as shown in Table 3 to obtain a film having a refractive index in the thickness direction of 1.6580, film breakage occurred frequently and a biaxially oriented film could not be obtained.

Examples 24 and 25

Biaxially oriented films were obtained in the same manner as in Example 19 except that film forming conditions such as stretching rate and stretching temperature in the transverse direction were set as shown in Table 3. The biaxially oriented films were then wound up in a roll form. The characteristic properties of the obtained films are shown in Table 3.

Since the films obtained in Examples 24 and 25 were inferior in stretchability because the stretching rate in the transverse direction did not fall within the preferred range. Although they had a relatively low breakdown voltage, they had excellent windability and could be put to practical use as a highly insulating film.

Example 26

A biaxially oriented film was obtained in the same manner as in Example 19 except that a mixture obtained by adding 0.6 part by mass (0.6 mass % in the obtained film) of spherical silica particles having an average particle diameter of 1.1 μm, a relative standard deviation of 0.15 and a particle diameter ratio of 1.08 (Seahoster (registered trademark) of Nippon Shokubai Co., Ltd.) to 99.4 parts by mass of a resin composition was used. The characteristic properties of the obtained film are shown in Table 3.

Although the film obtained in Example 26 had relatively low windability and a low breakdown voltage, it could be put to practical use as a highly insulating film.

Example 27

A biaxially oriented film was obtained in the same manner as in Example 19 except that 0.3 part by mass (0.3 mass % in the obtained film) of spherical silicone resin particles having an average particle diameter of 1.3 μm, a relative standard deviation of 0.14 and a particle diameter ratio of 1.10 as the inert fine particles A3 and 0.2 part by mass (0.2 mass % in the obtained film) of spherical silica particles having an average particle diameter of 0.3 μm, a relative standard deviation of 0.16 and a particle diameter ratio of 1.08 (Seahoster (registered trademark) of Nippon Shokubai Co., Ltd.) as the inert fine particles B3 were used. The characteristic properties of the obtained film are shown in Table 3.

The film obtained in Example 27 had excellent stretchability and windability and a high breakdown voltage and therefore was preferred as a highly insulating film. Therefore, it was preferred as an insulator for capacitors and also as an insulator for capacitors used especially in hybrid cars.

Example 28

A biaxially oriented film was obtained in the same manner as in Example 19 except that polyethylene naphthalate resin (melting point of 269° C., dielectric constant of 3.1) was used as the resin X. The characteristic properties of the obtained film are shown in Table 3. Although the film obtained in Example 28 had a relatively low breakdown voltage, it had excellent stretchability and windability and could be put to practical use as a highly insulating film.

Example 29

A biaxially oriented film was obtained in the same manner as in Example 19 except that polypropylene resin (melting point of 170° C., dielectric constant of 2.1) was used as the resin X. The characteristic properties of the obtained film are shown in Table 3. Although the film obtained in Example 29 had a relatively low breakdown voltage at a high temperature probably because the heat resistance of the polypropylene used as the resin X was low, it could be put to practical use as a highly insulating film.

Example 30

A biaxially oriented film was obtained in the same manner as in Example 19 except that polycarbonate resin (melting point of 243° C., dielectric constant of 2.8) was used as the resin X. The characteristic properties of the obtained film are shown in Table 3.

TABLE 3

| | | | Unit | Ex. 17 | Ex. 18 | Ex. 19 | Ex. 20 | Ex. 21 |
|---|---|---|---|---|---|---|---|---|
| Resin composition | Styrene-based polymer | Amount | mass % | 100 | 95 | 90 | 80 | 70 |
| | Resin X | Type | — | — | — | PET | PET | PET | PET |
| | | Dielectric constant | — | — | 3.2 | 3.2 | 3.2 | 3.2 |
| | | Melting point | ° C. | — | 258 | 258 | 258 | 258 |
| | | Amount | mass % | 0 | 5 | 10 | 20 | 30 |
| Film forming conditions | Longitudinal stretching | Draw ratio | Times | 3.2 | 3.2 | 3.2 | 3.2 | 3.2 |
| | | Temperature | ° C. | 114 | 114 | 114 | 114 | 114 |
| | Transverse stretching | Draw ratio | Times | 3.3 | 3.3 | 3.3 | 3.3 | 3.3 |
| | | Rate | %/min | 5000 | 5000 | 5000 | 5000 | 5000 |
| | | Temperature First stage | ° C. | 102 | 102 | 102 | 102 | 102 |
| | | Last stage | ° C. | 119 | 119 | 119 | 119 | 119 |
| | Heat setting temperature | | ° C. | 235 | 235 | 235 | 235 | 235 |
| | Relaxation rate | | % | 4 | 4 | 4 | 4 | 4 |
| | Relaxation temperature | | ° C. | ~180 | ~180 | ~180 | ~180 | ~180 |

| | | | Unit | Example 17 | Example 18 | Example 19 | Example 20 | Example 21 |
|---|---|---|---|---|---|---|---|---|
| Film properties | Stretchability | | — | ◉ | ◉ | ◉ | ◉ | ◉ |
| | Windability | | — | A | A | A | A | A |
| | Film thickness | | μm | 3.0 | 3.0 | 3.0 | 3.0 | 3.0 |
| | Center line average surface roughness (Ra) | | nm | 55 | 55 | 54 | 53 | 52 |
| | 10-point average roughness (Rz) | | nm | 1260 | 1270 | 1280 | 1300 | 1290 |
| | Refractive index in thickness direction (nZ) | | — | 1.6185 | 1.6179 | 1.6163 | 1.6151 | 1.6136 |
| | Heat shrinkage factor | Longitudinal direction | % | 3.3 | 3.2 | 3.3 | 3.4 | 3.4 |
| | | Transverse direction | % | 1.5 | 1.5 | 1.5 | 1.6 | 1.6 |

TABLE 3-continued

|  |  |  | | | | | |
|---|---|---|---|---|---|---|---|
| | Breakdown voltage | 23° C. | V/μm | 320 | 360 | 400 | 410 | 395 |
| | | 100° C. | V/μm | 310 | 350 | 385 | 395 | 375 |
| | | 120° C. | V/μm | 300 | 335 | 370 | 365 | 345 |

| | | | Unit | Example 22 | Comparative Example 7 | Example 23 | Comparative Example 8 |
|---|---|---|---|---|---|---|---|
| Resin composition | Styrene-based polymer | Amount | mass % | 50 | 90 | 90 | 90 |
| | Resin X | Type | — | PET | PET | PET | PET |
| | | Dielectric constant | — | 3.2 | 3.2 | 3.2 | 3.2 |
| | | Melting point | ° C. | 258 | 258 | 258 | 258 |
| | | Amount | mass % | 50 | 10 | 10 | 10 |
| Film forming conditions | Longitudinal stretching | Draw ratio | Times | 3.2 | 2.6 | 3.9 | 4.9 |
| | | Temperature | ° C. | 114 | 112 | 118 | 119 |
| | Transverse stretching | Draw ratio | Times | 3.3 | 2.7 | 4.0 | 5.0 |
| | | Rate | %/min | 5000 | 5000 | 5000 | 5000 |
| | | Temperature First stage | ° C. | 102 | 100 | 114 | 117 |
| | | Last stage | ° C. | 119 | 111 | 126 | 128 |
| | Heat setting temperature | | ° C. | 235 | 235 | 235 | 235 |
| | Relaxation rate | | % | 4 | 4 | 4 | 4 |
| | Relaxation temperature | | ° C. | ~180 | ~180 | ~180 | ~180 |
| Film properties | Stretchability | | — | ◎ | ◎ | ◎ | XX |
| | Windability | | — | A | C | A | — |
| | Film thickness | | μm | 3.0 | 3.0 | 3.0 | — |
| | Center line average surface roughness (Ra) | | nm | 52 | 49 | 54 | — |
| | 10-point average roughness (Rz) | | nm | 1280 | 1280 | 1280 | — |
| | Refractive index in thickness direction (nZ) | | — | 1.6107 | 1.6003 | 1.6350 | — |
| | Heat shrinkage factor | Longitudinal direction | % | 3.4 | 2.5 | 3.5 | — |
| | | Transverse direction | % | 1.6 | 0.4 | 1.7 | — |
| | Breakdown voltage | 23° C. | V/μm | 320 | 250 | 410 | — |
| | | 100° C. | V/μm | 300 | 230 | 395 | — |
| | | 120° C. | V/μm | 280 | 210 | 375 | — |

| | | | Unit | Ex. 24 | Ex. 25 | Ex. 26 | Ex. 27 | Ex. 28 | Ex. 29 | Ex. 30 |
|---|---|---|---|---|---|---|---|---|---|---|
| Resin composition | Styrene-based polymer | Amount | mass % | 90 | 90 | 90 | 90 | 90 | 90 | 90 |
| | Resin X | Type | — | PET | PET | PET | PET | PEN | PP | PC |
| | | Dielectric constant | — | 3.2 | 3.2 | 3.2 | 3.2 | 3.1 | 2.1 | 2.8 |
| | | Melting point | ° C. | 258 | 258 | 258 | 258 | 269 | 170 | 243 |
| | | Amount | mass % | 10 | 10 | 10 | 10 | 10 | 10 | 10 |
| Film forming conditions | Longitudinal stretching | Draw ratio | Times | 3.2 | 3.2 | 3.2 | 3.2 | 3.2 | 3.2 | 3.2 |
| | | Temperature | ° C. | 114 | 114 | 114 | 114 | 114 | 114 | 114 |
| | Transverse stretching | Draw ratio | Times | 3.3 | 3.3 | 3.3 | 3.3 | 3.3 | 3.3 | 3.3 |
| | | Rate | %/min | 400 | 35000 | 5000 | 5000 | 5000 | 5000 | 5000 |
| | | Temperature First stage | ° C. | 101 | 101 | 102 | 102 | 102 | 102 | 102 |
| | | Last stage | ° C. | 118 | 118 | 119 | 119 | 119 | 119 | 119 |
| | Heat setting temperature | | ° C. | 235 | 235 | 235 | 235 | 235 | 235 | 235 |
| | Relaxation rate | | % | 4 | 4 | 4 | 4 | 4 | 4 | 4 |
| | Relaxation temperature | | ° C. | ~180 | ~180 | ~180 | ~180 | ~180 | ~180 | ~180 |

| | | | Unit | Example 24 | Example 25 | Example 26 | Example 27 | Example 28 | Example 29 | Example 30 |
|---|---|---|---|---|---|---|---|---|---|---|
| Film properties | Stretchability | | — | Δ | Δ | ◎ | ◎ | ◎ | ◎ | ◎ |
| | Windability | | — | A | A | B | A | A | A | A |
| | Film thickness | | μm | 3.0 | 3.0 | 3.0 | 3.0 | 3.0 | 3.0 | 3.0 |
| | Center line average surface roughness (Ra) | | nm | 54 | 54 | 88 | 55 | 54 | 55 | 53 |
| | 10-point average roughness (Rz) | | nm | 1280 | 1280 | 1790 | 1390 | 1280 | 1300 | 1260 |
| | Refractive index in thickness direction (nZ) | | — | 1.6173 | 1.6149 | 1.6163 | 1.6162 | 1.6182 | 1.6143 | 1.6167 |
| | Heat shrinkage | Longitudinal direction | % | 3.4 | 3.3 | 3.3 | 3.3 | 3.0 | 3.7 | 3.4 |

TABLE 3-continued

| | | | | | | | | | |
|---|---|---|---|---|---|---|---|---|---|
| factor | Transverse direction | % | 1.5 | 1.4 | 1.5 | 1.5 | 1.3 | 1.9 | 1.6 |
| Breakdown voltage | 23° C. | V/μm | 340 | 335 | 345 | 405 | 345 | 375 | 305 |
| | 100° C. | V/μm | 330 | 325 | 335 | 390 | 340 | 355 | 295 |
| | 120° C. | V/μm | 320 | 320 | 320 | 375 | 335 | 325 | 290 |

Ex.: Example
PET: polyethylene terephthalate resin
PEN: polyethylene naphthalate resin
PP: polypropylene resin
PC: polycarbonate resin A capacitor was produced as follows by using each of the obtained films.

Aluminum was first vacuum deposited on one side of the film to a thickness of 500 Å. At this point, aluminum was deposited in vertical stripes which consisted of 8 mm-wide deposited portions and 1 mm-wide non-deposited portions. The obtained deposited film was slit at the center portions in the width directions of the deposited portions and the non-deposited portions, and the obtained 4.5 mm-wide tapes, each consisting of a 4 mm-wide deposited portion and a 0.5 mm-wide non-deposited portion, were wound up to obtain reels. Then, two reels were joined together in such a manner that their non-deposited portions were located at the respective opposite ends and wound up to obtain a roll which was pressed at 150° C. and 1 MPa for 5 minutes. Metallikon was thermally sprayed over the both end faces of the pressed roll to form external electrodes and a lead wire was welded to the Metallikon to produce a rolled film capacitor.

The film capacitors comprising the films of Examples 18 to 29 had excellent heat resistance and withstand voltage characteristics and showed excellent performance as a capacitor. They were also excellent in workability at the time of producing a capacitor.

Particularly, the film capacitors comprising the films of Examples 19 to 23 and 27 were excellent in heat resistance and particularly excellent in withstand voltage characteristics and showed more excellent performance as a capacitor.

Examples 31 to 45 and Comparative Examples 9 and 10

The following characteristic property values of Examples 31 to 45 and Comparative Examples 9 and 10 were measured and evaluated by the same methods as in Examples 8 to 16.
(1-1) average particle diameter and particle diameter ratio of powders
(1-2) average particle diameter and particle diameter ratio of particles contained in film
(2) relative standard deviation of particle diameter of particles
(3-1) center line average surface roughness (Ra)
(3-2) 10-point average roughness (Rz)
(4) heat shrinkage factor
(5) refractive index
(6) breakdown voltage (BDV)
(7) stretchability The following characteristic property values were measured and evaluated by the following methods.
(8) windability In the film production process, the film was wound up in the form of a roll having a width of 500 mm and a length of 9,000 m at a rate of 140 m/min to evaluate the wound form of the obtained roll and telescoping as follows.

[Wound Form]
A: good wound form without pimples on the surface of the roll
B: almost satisfactory wound form with 1 or more and less than 4 pimples (projections) on the surface of the roll
C: slightly unsatisfactory wound form with 4 or more and less than 10 pimples (projections) on the surface of the roll but can be used as a product
D: bad wound form with 10 or more pimples (projections) on the surface of the roll and cannot be used as a product.

[Telescoping]
⊚: satisfactory with a telescoping of less than 0.5 mm
○: almost satisfactory with a telescoping of 0.5 mm or more and less than 1 mm
Δ: slightly unsatisfactory with a telescoping of 1 mm or more and less than 2 mm but can be used as a product
X: unsatisfactory with a telescoping of 2 mm or more and cannot be used as a product
XX: telescoping becomes large during winding and a 9,000 m roll cannot be formed (9) thermal decomposition temperature The temperature at which the change of the mass of the film was started was obtained from a temperature/mass change curve obtained by measuring in an air atmosphere at a temperature elevation rate of 10° C./min with a differential heat/heat mass simultaneous measuring instrument (TG/DTA220, tradename, of Seiko Instruments Inc.) in accordance with a tangent method and taken as a thermal decomposition temperature (unit: ° C.).

(10) glass transition point temperature and melting point

About 10 mg of a sample was encapsulated into a measurement aluminum pan which was then set in a differential calorimeter (DSC2920, tradename, Modulated of TA Instruments Inc.) and heated from 25 to 300° C. at a rate of 20° C./min to measure its glass transition temperature (unit: ° C.) and melting point (unit: ° C.).

Example 32

0.5 part by mass (0.5 mass % based on the mass of the obtained film) of pentaerythritol tetrakis[3-(3,5-di-t-butyl-4-hydroxyphenyl)propionate] (IRGANOX1010, tradename, of Ciba Specialty Chemicals Holding Inc.) (melting point of 120° C., thermal decomposition temperature of 335° C.) as an antioxidant, 0.3 part by mass (0.3 mass % based on the mass of the obtained film) of spherical silica particles having an average particle diameter of 1.1 μm, a relative standard deviation of 0.15 and a particle diameter ratio of 1.08 (Seahoster KE, tradename, of Nippon Shokubai Co., Ltd.) as the inert fine particles A4 and 0.2 part by mass (0.2 mass % based on the mass of the obtained film) of spherical silica particles having an average particle diameter of 0.3 μm, a relative standard deviation of 0.16 and a particle diameter ratio of 1.08 (Seahoster KE, tradename, of Nippon Shokubai Co., Ltd.) as the inert fine particles B4 were mixed with 99.0 parts by mass of polystyrene which had a weight average molecular weight of $3.0 \times 10^5$ and whose structure was observed as almost perfectly syndiotactic in the $^{13}$C-NMR measurement to obtain a resin mixture.

The obtained resin mixture was dried at 130° C. for 7 hours, supplied into an extruder to be molten at 290° C., extruded from a die slit and solidified by cooling on a casting drum cooled to 20° C. to obtain an unstretched sheet.

This unstretched sheet was stretched to 3.2 times in the longitudinal direction (mechanical axis direction) at 114° C. and then guided to a tender to be stretched to 3.3 times in the transverse direction (direction perpendicular to the mechanical axis direction). At this point, the stretching rate in the transverse direction was 5,000%/min. The stretching temperature in the transverse direction was 102° C. in the first stage and 119° C. in the last stage. Thereafter, the sheet was heat set at 235° C. for 9 seconds and relaxed 4% in the transverse direction while it was cooled to 180° C. to obtain a biaxially oriented film having a thickness of 3.0 μm which was then wound up in a roll form. The characteristic properties of the obtained film are shown in Table 4.

Examples 33 to 35, Example 31 and Example 36

Biaxially oriented films having a thickness of 3.0 μm were obtained in the same manner as in Example 32 except that the content of the antioxidant was changed as shown in Table 4 and then wound up in a roll form. The characteristic properties of the obtained films are shown in Table 4. The amount of polystyrene was adjusted to set the total weight to 100 parts by mass.

Example 37

A biaxially oriented film having a thickness of 3.0 μm was obtained in the same manner as in Example 33 except that N,N'-bis[3-(3,5-di-t-butyl-4-hydroxyphenyl)propionyl]hydrazine (IRGANOX1024, tradename, of Ciba Specialty Chemicals Holding Inc.) (melting point of 210° C., thermal decomposition temperature of 275° C.) was used as the antioxidant and wound up in a roll form. The characteristic properties of the obtained film are shown in Table 4.

Information on the type and content of the antioxidant can be obtained from Examples 31 to 37.

The films obtained in Examples 32 to 35 had excellent stretchability and windability and a high breakdown voltage and therefore were preferred as an insulator for capacitors.

The film obtained in Example 37 in which an antioxidant different from that of Examples 32 to 35 was used also had excellent stretchability and windability and a high breakdown voltage and therefore was preferred as an insulator for capacitors.

Example 38

A biaxially oriented film having a thickness of 3.0 μm was obtained in the same manner as in Example 33 except that 98.6 parts by mass of polystyrene and 0.4 part by mass (0.4 mass % based on the mass of the obtained film) of spherical silica particles having an average particle diameter of 0.27 μm, a relative standard deviation of 0.16 and a particle diameter ratio of 1.08 (Seahoster KE, tradename, of Nippon Shokubai Co., Ltd.) as the inert fine particles A4 were used and the inert fine particles B4 were not added and wound up in a roll form. The characteristic properties of the obtained film are shown in Table 4.

Examples 39 to 41

Biaxially oriented films having a thickness of 3.0 μm were obtained in the same manner as in Example 38 except that the average particle diameter, relative standard deviation, particle diameter ratio and content of spherical silica particles as the inert fine particles A4 were changed as shown in Table 4 and wound up in a roll form. The characteristic properties of the obtained films are shown in Table 4. The amount of polystyrene was adjusted to set the total weight to 100 parts by mass.

Example 42

A biaxially oriented film having a thickness of 3.0 μm was obtained in the same manner as in Example 33 except that 0.1 part by mass (0.1 mass % based on the mass of the obtained film) of spherical silica particles having an average particle diameter of 0.5 μm, a relative standard deviation of 0.15 and a particle diameter ratio of 1.08 (Seahoster KE, tradename, of Nippon Shokubai Co., Ltd.) as the inert fine particles A4 and 0.5 part by mass (0.5 mass % based on the mass of the obtained film) of spherical silica particles having an average particle diameter of 0.1 μm, a relative standard deviation of 0.17 and a particle diameter ratio of 1.07 (Seahoster KE, tradename, of Nippon Shokubai Co., Ltd.) as the inert fine particles B4 were mixed with 98.4 parts by mass of polystyrene and wound up in a roll form. The characteristic properties of the obtained film are shown in Table 4.

Examples 43 and 44

Biaxially oriented films having a thickness of 3.0 μm were obtained in the same manner as in Example 42 except that the average particle diameter, relative standard deviation, particle diameter ratio and content of the spherical silica particles as the inert fine particles A4 and the average particle diameter, relative standard deviation, particle diameter ratio and content of the spherical silica particles as the inert fine particles B4 were changed as shown in Table 4 and wound up in a roll form. The characteristic properties of the obtained films are shown in Table 4. The amount of polystyrene was adjusted to set the total mass to 100 parts by mass.

Example 45

A biaxially oriented film having a thickness of 3.0 μm was obtained in the same manner as in Example 33 except that 0.3 part by mass (0.3 mass % based on the mass of the obtained film) of spherical silicone resin particles having an average particle diameter of 1.3 μm, a relative standard deviation of 0.14 and a particle diameter ratio of 1.10 were used as the inert fine particles A4 and wound up in a roll form. The characteristic properties of the obtained film are shown in Table 4.

Information on the inert fine particles A4 and the inert fine particles B4 could be obtained from Example 33 and Examples 38 to 45.

The films obtained in Examples 33 and 38 to 45 in which the contained inert fine particles were appropriate had excellent stretchability and windability and a high breakdown voltage and therefore were preferred as an insulator for capacitors.

Comparative Example 9 and Example 46

Biaxially oriented films having a thickness of 3.0 were obtained in the same manner as in Example 33 except that film forming conditions were changed as shown in Table 4 and wound up in a roll form. The characteristic properties of the obtained films are shown in Table 4.

Comparative Example 10

When a film having a refractive index in the thickness direction of about 1.6580 was to be formed in the same manner as in Example 33 except that film forming conditions such as draw ratios in the longitudinal direction and the transverse direction were changed as shown in Table 4, film breakage occurred frequently and a biaxially oriented film could not be obtained.

Information on the refractive index in the thickness direction of the film could be obtained from Examples 33 and 46 and Comparative Examples 9 and 10.

Since the films obtained in Examples 33 and 46 had an appropriate refractive index in the thickness direction, they had excellent stretchability and windability and a high breakdown voltage and therefore were preferred as an insulator for capacitors.

On the other hand, as the film obtained in Comparative Example 9 had a low draw ratio and a too low refractive index in the thickness direction of the film, it was inferior in windability and breakdown voltage.

In Comparative Example 10, as the target refractive index in the thickness direction was too high, a film could not be obtained.

TABLE 4

| | | | Unit | Example 31 | Example 32 | Example 33 | Example 34 |
|---|---|---|---|---|---|---|---|
| Inert fine particles A4 | | Type | — | Spherical silica particles | Spherical silica particles | Spherical silica particles | Spherical silica particles |
| | In film | Average particle diameter | μm | 1.1 | 1.1 | 1.1 | 1.1 |
| | | Relative standard deviation of particle diameter | — | 0.15 | 0.15 | 0.15 | 0.15 |
| | | Particle diameter ratio | — | 1.08 | 1.08 | 1.08 | 1.08 |
| | | Content | mass % | 0.3 | 0.3 | 0.3 | 0.3 |
| Inert fine particles B4 | | Type | — | Spherical silica particles | Spherical silica particles | Spherical silica particles | Spherical silica particles |
| | In film | Average particle diameter | μm | 0.3 | 0.3 | 0.3 | 0.3 |
| | | Relative standard deviation of particle diameter | — | 0.16 | 0.16 | 0.16 | 0.16 |
| | | Particle diameter ratio | — | 1.08 | 1.08 | 1.08 | 1.08 |
| | | Content | mass % | 0.2 | 0.2 | 0.2 | 0.2 |
| Antioxidant | | Type | — | — | C1 | C1 | C1 |
| | | Melting point | °C. | — | 120 | 120 | 120 |
| | | Thermal decomposition temperature | °C. | — | 335 | 335 | 335 |
| | | Content | mass % | — | 0.5 | 1.0 | 3.0 |
| Film forming conditions | | Draw ratio in longitudinal direction | Times | 3.2 | 3.2 | 3.2 | 3.2 |
| | | Longitudinal stretching temperature | °C. | 114 | 114 | 114 | 114 |
| | | Draw ratio in transverse direction | Times | 3.3 | 3.3 | 3.3 | 3.3 |
| | Transverse stretching temperature | First stage | °C. | 102 | 102 | 102 | 102 |
| | | Last stage | °C. | 119 | 119 | 119 | 119 |

| | | | Unit | Example 35 | Example 36 | Example 37 |
|---|---|---|---|---|---|---|
| Inert fine particles A4 | | Type | — | Spherical silica particles | Spherical silica particles | Spherical silica particles |
| | In film | Average particle diameter | μm | 1.1 | 1.1 | 1.1 |
| | | Relative standard deviation of particle diameter | — | 0.15 | 0.15 | 0.15 |
| | | Particle diameter ratio | — | 1.08 | 1.08 | 1.08 |
| | | Content | mass % | 0.3 | 0.3 | 0.3 |
| Inert fine particles B4 | | Type | — | Spherical silica particles | Spherical silica particles | Spherical silica particles |
| | In film | Average particle diameter | μm | 0.3 | 0.3 | 0.3 |
| | | Relative standard deviation of particle diameter | — | 0.16 | 0.16 | 0.16 |
| | | Particle diameter ratio | — | 1.08 | 1.08 | 1.08 |
| | | Content | mass % | 0.2 | 0.2 | 0.2 |
| Antioxidant | | Type | — | C1 | C1 | C2 |
| | | Melting point | °C. | 120 | 120 | 210 |
| | | Thermal decomposition temperature | °C. | 335 | 335 | 275 |
| | | Content | mass % | 5.0 | 9.0 | 1.0 |
| Film forming conditions | | Draw ratio in longitudinal direction | Times | 3.2 | 3.2 | 3.2 |
| | | Longitudinal stretching temperature | °C. | 114 | 114 | 114 |
| | | Draw ratio in transverse direction | Times | 3.3 | 3.3 | 3.3 |
| | Transverse stretching temperature | First stage | °C. | 102 | 102 | 102 |
| | | Last stage | °C. | 119 | 119 | 119 |

TABLE 4-continued

|  |  | Unit | Ex. 31 | Ex. 32 | Ex. 33 | Ex. 34 | Ex. 35 | Ex. 36 | Ex. 37 |
|---|---|---|---|---|---|---|---|---|---|
| Film characteristic properties | Stretchability | — | ◎ | ◎ | ◎ | ◎ | ◎ | ◎ | ◎ |
|  | Windability Wound form | — | A | A | A | A | A | A | A |
|  | Telescoping | — | ◎ | ◎ | ◎ | ◎ | ◎ | ◎ | ◎ |
|  | Film thickness | μm | 3.0 | 3.0 | 3.0 | 3.0 | 3.0 | 3.0 | 3.0 |
|  | Center line average surface roughness (Ra) | nm | 54 | 55 | 55 | 55 | 55 | 54 | 55 |
|  | 10-point average roughness (Rz) | nm | 1270 | 1270 | 1270 | 1270 | 1270 | 1280 | 1270 |
|  | Refractive index in thickness direction (nZ) | — | 1.6185 | 1.6184 | 1.6183 | 1.6179 | 1.6175 | 1.6170 | 1.6183 |
| Heat shrinkage factor | Longitudinal direction | % | 3.2 | 3.2 | 3.2 | 3.3 | 3.3 | 3.3 | 3.2 |
|  | Transverse direction | % | 1.5 | 1.5 | 1.5 | 1.6 | 1.6 | 1.6 | 1.6 |
| Breakdown voltage | 23° C. | V/μm | 310 | 355 | 390 | 405 | 340 | 310 | 380 |
|  | 100° C. | V/μm | 300 | 345 | 380 | 395 | 330 | 300 | 370 |
|  | 120° C. | V/μm | 290 | 335 | 370 | 385 | 320 | 295 | 360 |

|  |  | Unit | Example 38 | Example 39 | Example 40 | Example 41 |
|---|---|---|---|---|---|---|
| Inert fine particles A4 | Type | — | Spherical silica particles | Spherical silica particles | Spherical silica particles | Spherical silica particles |
|  | In film Average particle diameter | μm | 0.27 | 0.27 | 0.5 | 0.5 |
|  | Relative standard deviation of particle diameter | — | 0.16 | 0.16 | 0.15 | 0.15 |
|  | Particle diameter ratio | — | 1.08 | 1.08 | 1.08 | 1.08 |
|  | Content | mass % | 0.4 | 0.8 | 0.3 | 0.6 |
| Inert fine particles B4 | Type | — | Nil | Nil | Nil | Nil |
|  | In film Average particle diameter | μm | — | — | — | — |
|  | Relative standard deviation of particle diameter | — | — | — | — | — |
|  | Particle diameter ratio | — | — | — | — | — |
|  | Content | mass % | — | — | — | — |
| Antioxidant | Type | — | C1 | C1 | C1 | C1 |
|  | Melting point | ° C. | 120 | 120 | 120 | 120 |
|  | Thermal decomposition temperature | ° C. | 335 | 335 | 335 | 335 |
|  | Content | mass % | 1.0 | 1.0 | 1.0 | 1.0 |
| Film forming conditions | Draw ratio in longitudinal direction | Tmes | 3.2 | 3.2 | 3.2 | 3.2 |
|  | Longitudinal stretching temperature | ° C. | 114 | 114 | 114 | 114 |
|  | Draw ratio in transverse direction | Times | 3.3 | 3.3 | 3.3 | 3.3 |
| Transverse stretching temperature | First stage | ° C. | 102 | 102 | 102 | 102 |
|  | Last stage | ° C. | 119 | 119 | 119 | 119 |

|  |  | Unit | Example 42 | Example 43 | Example 44 | Example 45 |
|---|---|---|---|---|---|---|
| Inert fine particles A4 | Type | — | Spherical silica particles | Spherical silica particles | Spherical silica particles | Silicon resin particles |
|  | In film Average particle diameter | μm | 0.5 | 0.8 | 1.6 | 1.3 |
|  | Relative standard deviation of particle diameter | — | 0.15 | 0.15 | 0.15 | 0.14 |
|  | Particle diameter ratio | — | 1.08 | 1.08 | 1.10 | 1.10 |
|  | Content | mass % | 0.1 | 0.5 | 0.1 | 0.3 |
| Inert fine particles B4 | Type | — | Spherical silica particles | Spherical silica particles | Spherical silica particles | Spherical silica particles |
|  | In film Average particle diameter | μm | 0.1 | 0.4 | 0.1 | 0.3 |
|  | Relative standard deviation of particle diameter | — | 0.17 | 0.15 | 0.17 | 0.16 |
|  | Particle diameter ratio | — | 1.07 | 1.08 | 1.07 | 1.08 |
|  | Content | mass % | 0.5 | 0.1 | 0.5 | 0.2 |
| Antioxidant | Type | — | C1 | C1 | C1 | C1 |
|  | Melting point | ° C. | 120 | 120 | 120 | 120 |
|  | Thermal decomposition temperature | ° C. | 335 | 335 | 335 | 335 |
|  | Content | mass % | 1.0 | 1.0 | 1.0 | 1.0 |
| Film forming conditions | Draw ratio in longitudinal direction | Tmes | 3.2 | 3.2 | 3.2 | 3.2 |
|  | Longitudinal stretching temperature | ° C. | 114 | 114 | 114 | 114 |
|  | Draw ratio in transverse direction | Times | 3.3 | 3.3 | 3.3 | 3.3 |
| Transverse stretching | First stage | ° C. | 102 | 102 | 102 | 102 |
|  | Last stage | ° C. | 119 | 119 | 119 | 119 |

TABLE 4-continued temperature

|  |  | Unit | Ex. 38 | Ex. 39 | Ex. 40 | Ex. 41 | Ex. 42 | Ex. 43 | Ex. 44 | Ex. 45 |
|---|---|---|---|---|---|---|---|---|---|---|
| Film characteristic properties | Stretchability | — | ◎ | ◎ | ◎ | ◎ | ◎ | ◎ | ◎ | ◎ |
| | Windability Wound form | — | C | C | C | C | C | B | B | A |
| | Telescoping | — | Δ | Δ | Δ | Δ | ◯ | ◯ | ◎ | ◎ |
| | Film thickness | μm | 3.0 | 3.0 | 3.0 | 3.0 | 3.0 | 3.0 | 3.0 | 3.0 |
| | Center line average surface roughness (Ra) | nm | 18 | 28 | 25 | 34 | 19 | 48 | 45 | 57 |
| | 10-point average roughness (Rz) | nm | 270 | 440 | 420 | 670 | 260 | 710 | 1550 | 1290 |
| | Refractive index in thickness direction (nZ) | — | 1.6183 | 1.6183 | 1.6183 | 1.6183 | 1.6183 | 1.6180 | 1.6181 | 1.6181 |
| Heat shrinkage factor | Longitudinal direction | % | 3.2 | 3.2 | 3.2 | 3.2 | 3.2 | 3.2 | 3.2 | 3.2 |
| | Transverse direction | % | 1.5 | 1.5 | 1.5 | 1.5 | 1.5 | 1.5 | 1.5 | 1.5 |
| Breakdown voltage | 23° C. | V/μm | 390 | 380 | 390 | 390 | 390 | 385 | 375 | 395 |
| | 100° C. | V/μm | 380 | 370 | 380 | 380 | 380 | 375 | 370 | 390 |
| | 120° C. | V/μm | 370 | 360 | 370 | 370 | 370 | 365 | 360 | 375 |

|  |  | Unit | Comparative Example 9 | Example 46 | Comparative Example 10 |
|---|---|---|---|---|---|
| Inert fine particles A4 | Type | — | Spherical silica particles | Spherical silica particles | Spherical silica particles |
| | In film Average particle diameter | μm | 1.1 | 1.1 | 1.1 |
| | Relative standard deviation of particle diameter | — | 0.15 | 0.15 | 0.15 |
| | Particle diameter ratio | — | 1.08 | 1.08 | 1.08 |
| | Content | mass % | 0.3 | 0.3 | 0.3 |
| Inert fine particles B4 | Type | — | Spherical silica particles | Spherical silica particles | Spherical silica particles |
| | In film Average particle diameter | μm | 0.3 | 0.3 | 0.3 |
| | Relative standard deviation of particle diameter | — | 0.16 | 0.16 | 0.16 |
| | Particle diameter ratio | — | 1.08 | 1.08 | 1.08 |
| | Content | mass % | 0.2 | 0.2 | 0.2 |
| Antioxidant | Type | — | C1 | C1 | C1 |
| | Melting point | ° C. | 120 | 120 | 120 |
| | Thermal decomposition temperature | ° C. | 335 | 335 | 335 |
| | Content | mass % | 1.0 | 1.0 | 1.0 |
| Film forming conditions | Draw ratio in longitudinal direction | Times | 2.6 | 3.9 | 4.9 |
| | Longitudinal stretching temperature | ° C. | 112 | 118 | 119 |
| | Draw ratio in transverse direction | Times | 2.7 | 4.0 | 5.0 |
| | Transverse stretching temperature First stage | ° C. | 100 | 114 | 117 |
| | Last stage | ° C. | 111 | 126 | 128 |
| Film characteristic properties | Stretchability | — | ◎ | ◯ | XX |
| | Windability Wound form | — | B | A | — |
| | Telescoping | — | ◯ | ◎ | — |
| | Film thickness | μm | 3.0 | 3.0 | — |
| | Center line average surface roughness (Ra) | nm | 49 | 54 | — |
| | 10-point average roughness (Rz) | nm | 1180 | 1280 | — |
| | Refractive index in thickness direction (nZ) | — | 1.6038 | 1.6374 | — |
| Heat shrinkage factor | Longitudinal direction | % | 2.5 | 3.5 | — |
| | Transverse direction | % | 0.4 | 1.7 | — |
| Breakdown voltage | 23° C. | V/μm | 260 | 400 | — |
| | 100° C. | V/μm | 245 | 390 | — |
| | 120° C. | V/μm | 225 | 380 | — |

Ex.: Example
Antioxidant C1: pentaerythritol tetrakis[3-(3,5-di-t-butyl-4-hydroxyphenyl)propionate] (IRGANOX1010)
Antioxidant C2: N,N'-bis[3-(3,5-di-t-butyl-4-hydroxyphenyl)propionyl]hydrazine (IRGANOX1024)

A capacitor was produced as follows by using each of the obtained films.

Aluminum was first vacuum deposited on one side of the film to a thickness of 500 Å. At this point, aluminum was deposited in vertical stripes which consisted of 8 mm-wide deposited portions and 1 mm-wide non-deposited portions. The obtained deposited film was slit at the center portions in the width directions of the deposited portions and the non-deposited portions, and the obtained 4.5 mm-wide tapes, each consisting of a 4 mm-wide deposited portion and a 0.5 mm-wide non-deposited portion, were wound up to obtain reels. Then, two reels were joined together in such a manner that their non-deposited portions were located at the respective opposite ends and wound up to obtain a roll which was pressed at 150° C. and 1 MPa for 5 minutes. Metallikon was thermally sprayed over the both end faces of the pressed roll to form external electrodes and a lead wire was welded to the Metallikon to produce a rolled film capacitor.

The film capacitors comprising the films of Examples 32 to 46 had excellent heat resistance and withstand voltage characteristics and showed excellent performance as a capacitor. They were also excellent in workability at the time of producing a capacitor.

Particularly, the film capacitors comprising the films obtained in Examples 33, 34, 38, 40 to 42, 45 and 46 were particularly excellent in withstand voltage characteristics and showed excellent performance as a capacitor.

EFFECT OF THE INVENTION

The insulating film of the present invention is excellent in electric properties with a high breakdown voltage. The insulating film of the present invention is excellent in heat resistance with a small heat shrinkage factor and a high breakdown voltage at a high temperature. Further, the insulating film of the present invention has excellent windability with a good wound form and little telescoping.

INDUSTRIAL APPLICABILITY

The insulating film of the present invention can be advantageously used as an insulator for capacitors.

The invention claimed is:

1. A biaxially oriented insulating film which contains
   (i) a styrene-based polymer having a syndiotactic structure,
   (ii) 0.01 to 1.5 mass % of inert fine particles A4 based on 100 mass % of the film, the inert fine particles A4 having an average particle diameter of 0.2 to 3.0 μm and a relative standard deviation of particle diameter of 0.5 or less, and
   (iii) 1 to 3 mass % of at least one primary antioxidant selected from the group consisting of phenol-based antioxidants and amine-based antioxidants based on 100 mass % of the film,
   (iv) the biaxially oriented insulating film does not contain phosphorous-based antioxidants and sulfur-based antioxidants, and
   which has a refractive index in the thickness direction of 1.6050 to 1.6550.

2. The film according to claim 1 which contains 0.05 to 2.0 mass % of inert fine particles B4 based on 100 mass % of the film, the inert fine particles B4 having an average particle diameter of 0.01 to 0.5 μm which is 0.2 μm or more smaller than the average particle diameter of the inert fine particles A4 and a relative standard deviation of particle diameter of 0.5 or less.

3. The film according to claim 1, wherein the inert fine particles A4 are spherical particles having a particle diameter ratio of 1.0 to 1.3.

4. The film according to claim 1, wherein the inert fine particles A4 are spherical polymer resin particles.

5. The film according to claim 1, wherein the inert fine particles A4 are spherical silica particles.

6. The film according to claim 2, wherein the inert fine particles B4 are spherical silica particles having a particle diameter ratio of 1.0 to 1.3.

7. The film according to claim 1, wherein the thermal decomposition temperature of the antioxidant is 250° C. or higher.

8. The film according to claim 1 which has a film thickness of not less than 0.4 μm and less than 6.5 μm.

9. A capacitor comprising the film of claim 1.

* * * * *